US012052299B2

(12) United States Patent
Cossar et al.

(10) Patent No.: US 12,052,299 B2
(45) Date of Patent: Jul. 30, 2024

(54) SYSTEM AND METHOD TO IMPROVE VIDEO CONFERENCING USING PRESENCE METRICS

(71) Applicant: Virtual Sapiens Inc., Beverly, MA (US)

(72) Inventors: Rachel Cossar, Beverly, MA (US); Neal Kaiser, Swampscott, MA (US)

(73) Assignee: Virtual Sapiens Inc., Beverly, MA (US)

( * ) Notice: Subject to any disclaimer, the term of this patent is extended or adjusted under 35 U.S.C. 154(b) by 120 days.

(21) Appl. No.: 17/515,590

(22) Filed: Nov. 1, 2021

(65) Prior Publication Data

US 2022/0141266 A1 May 5, 2022

Related U.S. Application Data

(60) Provisional application No. 63/108,460, filed on Nov. 2, 2020.

(51) Int. Cl.

| | | |
|---|---|---|
| *H04L 65/403* | (2022.01) | |
| *G06N 20/00* | (2019.01) | |
| *G06Q 10/1093* | (2023.01) | |
| *G06V 20/40* | (2022.01) | |
| *G06V 40/20* | (2022.01) | |
| *G10L 25/63* | (2013.01) | |
| *H04L 65/1083* | (2022.01) | |

(52) U.S. Cl.
CPC .......... *H04L 65/403* (2013.01); *G06N 20/00* (2019.01); *G06Q 10/1095* (2013.01); *G06V 20/40* (2022.01); *G06V 40/20* (2022.01); *G10L 25/63* (2013.01); *H04L 65/1083* (2013.01)

(58) Field of Classification Search
CPC ... H04L 65/403; H04L 65/1083; G06N 20/00; G06V 20/40; G06V 40/20; G06Q 10/1095; G10L 25/63
See application file for complete search history.

(56) References Cited

U.S. PATENT DOCUMENTS

| | | | |
|---|---|---|---|
| 9,072,478 B1* | 7/2015 | Feerst | G09B 5/065 |
| 2012/0042274 A1* | 2/2012 | Guyon | G06Q 10/101 |
| | | | 715/780 |
| 2014/0302469 A1* | 10/2014 | Chen | G09B 19/00 |
| | | | 434/236 |
| 2017/0127021 A1* | 5/2017 | Frank | H04N 13/204 |
| 2018/0014754 A1* | 1/2018 | Gray | A61B 5/7455 |
| 2018/0241882 A1* | 8/2018 | Lee | H04N 7/147 |
| 2018/0330178 A1* | 11/2018 | el Kaliouby | B60W 50/082 |
| 2020/0065612 A1* | 2/2020 | Xu | G06V 40/174 |

(Continued)

*Primary Examiner* — Olisa Anwah

(57) ABSTRACT

A system and method of image analytics, computer vision focused on monitoring specific virtual presence metrics will provide each individual user with consistent progress reports and live feedback during video meetings. Machine learning and AI are leveraged to provide professionals with feedback and coaching according to virtual presence metrics in order to develop a new skill set through and elevate the user's virtual presence. Pre-trained machine learning models combined with the founders own thought leadership in nonverbal communication, presence and body language assists in assessing posture, gesture, eye contact, filler words and speech metrics, sentiment analysis and other presence and communication features.

5 Claims, 34 Drawing Sheets

(56) References Cited

U.S. PATENT DOCUMENTS

| | | | | |
|---|---|---|---|---|
| 2020/0197746 A1* | 6/2020 | Kang | ................... | A61B 5/7425 |
| 2020/0380264 A1* | 12/2020 | Poteet | ................... | G06V 20/47 |
| 2021/0097267 A1* | 4/2021 | Stokman | ............... | G06V 40/28 |
| 2021/0264909 A1* | 8/2021 | Reece | .................. | G06V 10/774 |
| 2021/0401295 A1* | 12/2021 | Zhi | .......................... | G06N 3/04 |
| 2022/0012989 A1* | 1/2022 | Kurien | ................... | G06F 3/011 |
| 2022/0076211 A1* | 3/2022 | Yoo | .................... | G06Q 10/1053 |
| 2022/0100992 A1* | 3/2022 | Ran | ........................ | G06V 40/23 |
| 2022/0182524 A1* | 6/2022 | Rewatkar | ............... | H04N 23/71 |
| 2022/0310226 A1* | 9/2022 | Niri | ...................... | G06F 18/214 |

\* cited by examiner

Intro

Step Two

Step Three

Confirmation

Gestures

Gestures would essentially be monitored on a variability scale, pacing (too quick/blurred (not good) or weighted and emphatic (good).
See scoring below for more details

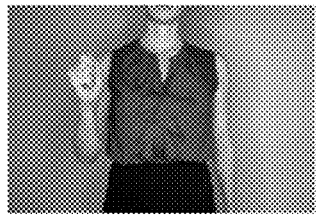
Use of 'baton arm'/fist, pumping up/down of hand to emphasize a point

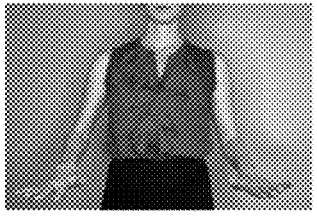
Palms down/authority and statement accent

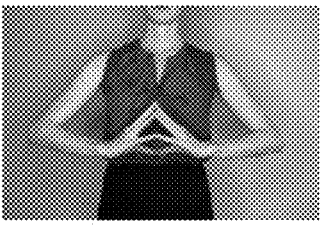
Steepling or other expansive/power hand posture

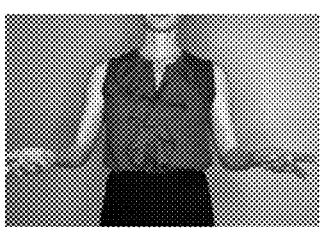
Palms up/outstretched/indicating openness, honesty, welcoming

Varied movements with clear pacing and easy-to-read distance from lens = Excellent
Spastic movements/same movement repeatedly/too close to lens = Medium
No movement = Poor

FIG. 3C

Eye contact/line of focus

Monitoring the average pattern of focus.
This one would be simple - looking directly as the camera = good. Looking away too often with a full head turn = not good.
If possible, eye contact/number of times looked at lens versus elsewhere. Looking at lens = good. Looking elsewhere = not good

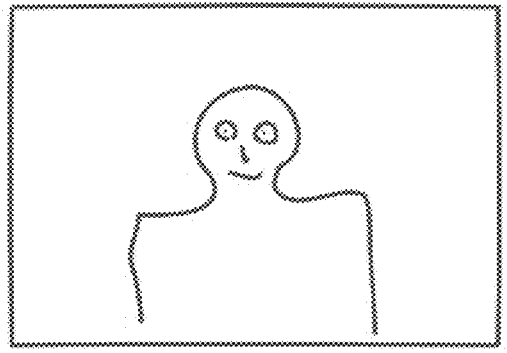

Good eye contact/focus

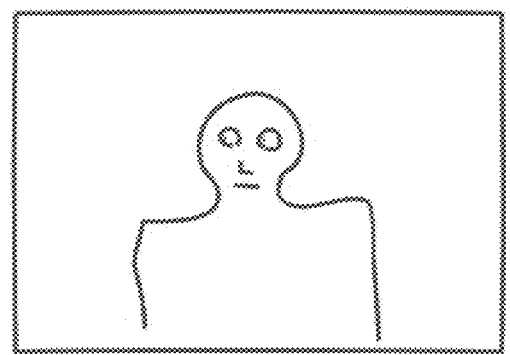

Looking away/distracted repeatedly

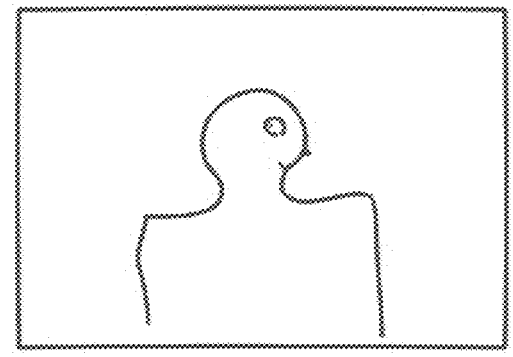

Fully looking at something else that is not aligned with camera lens

100%-75% within calibrated eye contact zone = Excellent
75%-50% within calibrated eye contact zone - Medium
50% below within calibrated eye contact zone= Poor

FIG. 3D

Tonality - BONUS add-on

Measuring the vocal variety of your voice (tone, pitch, volume, speed)

Filler words - BONUS add-on

Counting your filler words

FIG. 3E

ABOUT RACHEL COSSAR

Body Language & Presence Expert

Choreography for Business founder, Rachel Cossar, is a leading expert in virtual presence. A former professional ballet dancer turned body language and presence expert, Rachel coaches a range of professionals on elevating their virtual presence in professional settings.

Whether you are a sales professional, consultant, manager or member of a team, Rachel's personalized feedback will help you bring your professional communication to the next level.

Rachel Cossar is the author of When You Can't Meet in Person - A Guide to Mastering Virtual Presence and Communication. Her work and firm are featured in HBR, Boston Globe and Psychology Today.

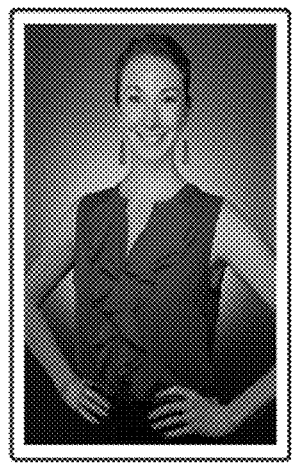

PERSONAL VIRTUAL PRESENCE ASSESSMENT

MY SCORE

Name: _____

Virtual Presence Summary

Virtual Presence Metrics

Score:

Feedback:

Score:

Feedback:

Score:

Feedback:

Additional areas of improvement:
- ○ Lighting
- ○ Framing
- ○ Background
- ○ Lens Height
- ○ Posture
- ○ Eye Contact
- ○ Facial
- ○ Gestures
- ○ Speech Speed
- ○ Filler Words
- ○ Uptick
- ○ Intonation
- ○ Volume Recommendations for Immediate Improvement

FIG. 6A

  VIRTUALSAPIENS 
TECHNOLOGY TO AMPLIFY HUMAN CONNECTION
Manage Connections
You can connect or disconnect to your accounts below. You must be connected to at least 1 provider.
 Disconnect from Google
 Connect to Outlook
 Connect to Zoom
DONE
FIG. 7E

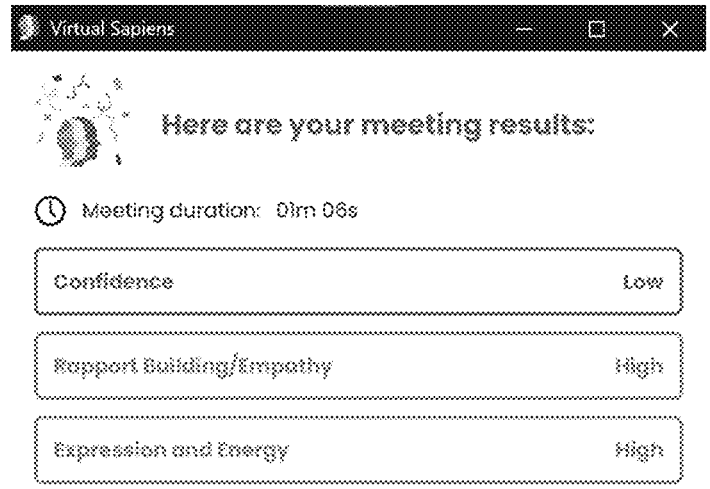

Top Areas to Improve

 Framing

Your frame is your playground. The way you place yourself within your frame sends an important message. Play around with our Pre-Call Framing check to get it just right before your next call.

Check out our video tips to improve your framing.

 Posture

At times your posture is slouched or otherwise not upright and open.

Why It Matters
A slouched posture can send a message of being tired, rundown, disinterested or lacking in confidence to your audience. A slouched appearance can be viewed as being small, can reduce trust and confidence in you as a speaker. Our posture is always sending a message, so we want to be intentional about how we hold ourselves at all times.

The Power of Posture:https://youtu.be/pypnn0ij_Qk

DONE

FIG. 8

SYSTEM AND METHOD TO IMPROVE VIDEO CONFERENCING USING PRESENCE METRICS

CROSS REFERENCE TO RELATED APPLICATIONS

The application claims priority to and the benefit of U.S. Provisional Patent Application Ser. No. 63/108,460, entitled "SYSTEM AND METHOD TO IMPROVE VIDEO CONFERENCING USING PRESENCE METRICS", filed on Nov. 2, 2020, the disclosure of which is incorporated herein by reference in its entirety.

BACKGROUND

The embodiments described herein relate to video conferencing, in particular, technologies related to feedback and analytics relating to improving video conferencing skills.

With the increase in video conferencing as a primary method of communication in business, workforces are lacking in the awareness and skills to make this channel effective. Video meetings are exhausting, poorly managed and frustrating for any professional (i.e., sales, management, consulting etc.) who must build relationships through this medium.

A system and method of providing improved video conferencing management is desired. Furthermore, it is also desirable to implement machine learning (ML) and artificial intelligence algorithm to assist with video conferencing management.

SUMMARY

A system and method of image analytics, computer vision focused on monitoring specific virtual presence metrics will provide each individual user with consistent progress reports and live feedback during video meetings. Machine learning and AI are leveraged to provide professionals with feedback and coaching according to virtual presence metrics in order to develop a new skill set through and elevate the user's virtual presence. Pre-trained machine learning models combined with the founders own thought leadership in nonverbal communication, presence and body language assists in assessing posture, gesture, eye contact, filler words and speech metrics, sentiment analysis and other presence and communication features.

With Virtual Sapiens technology, a user receives convenient feedback, coaching and reinforcement before a call (pre-call check), during the call, (Sidekick coaching) and after a call (post-call analytics and insights). The Sidekick product integrates into Google and Outlook calendars to allow for seamless auto-launch and video call aggregation. The Sidekick product also includes one-time virtual presence assessments, which are asynchronous (not tied to a scheduled/live call event) and can be launched at the user's will. Data analytics obtained by Virtual Sapiens during calls will also provide team leaders/managers with insights on call meta data as well as communication themes/areas in need of improvement across teams.

BRIEF DESCRIPTION OF THE DRAWINGS

FIGS. 3A to 3E are diagrams illustrating screenshots of a Virtual Presence Assessment.

FIGS. 4A to 4H are diagrams illustrating screenshots of a Virtual Presence Assessment experience.

FIGS. 5A to 5G are block diagrams illustrating screenshots on recording a Virtual Presence Assessment experience.

FIGS. 6A and 6B are diagrams illustrating an exemplary final assessment templates.

FIGS. 7A to 7F are diagrams illustrating screenshots of a Virtual Sapiens Sidekick experience.

FIG. 8 is a diagram illustrating a screenshot of post-call summary feedback.

DETAILED DESCRIPTION

Figure 1:
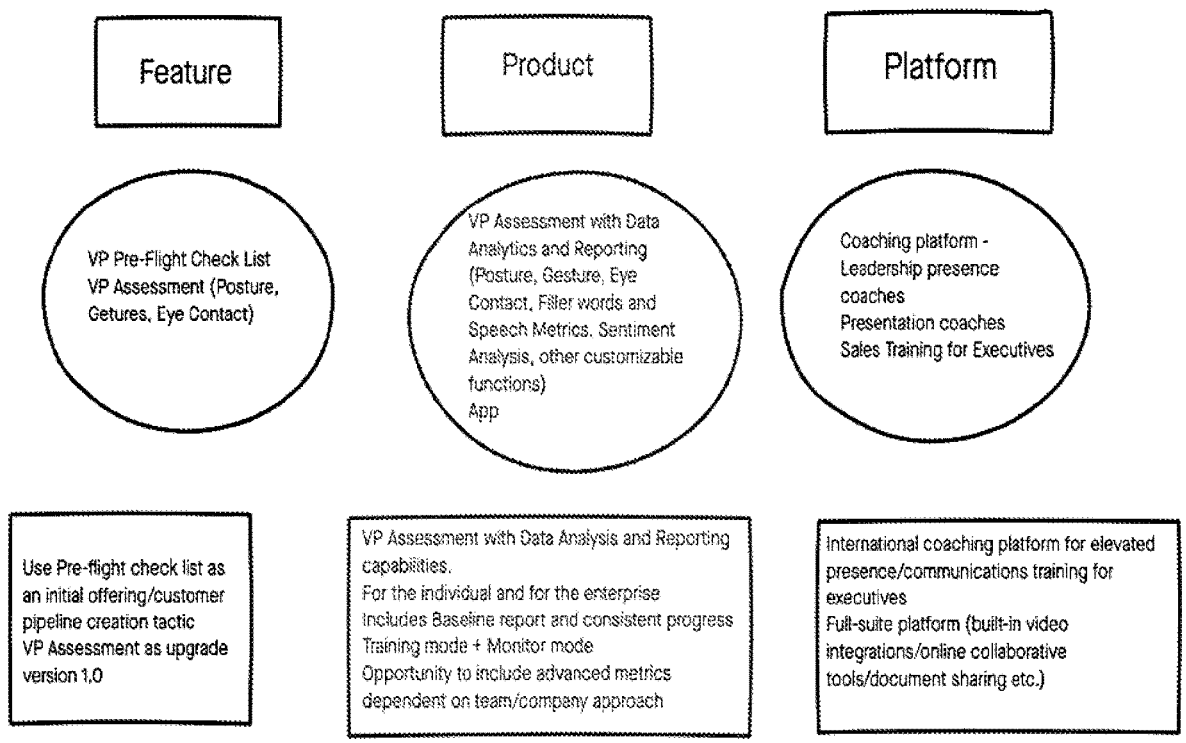
FIG. 1 is a block diagram illustrating components the Virtual Sapiens Platform.

The preferred embodiment is a hardware and software system, such as the Virtual Sapiens (VS) Platform, that provides video conference agnostic and convenient options for feedback and coaching. The VS Platform is a full suite of communication data analysis and reporting tools.

In a new world of communication, the Virtual Sapiens platform or system helps develop a new skill set through objective metrics designed to elevate the user's virtual presence. This will be useful for sales teams, presentation training and overall remote office management. It will also empower teams with the data to be the best communicators they can be, and to empower leaders/managers to better support their teams through increased communication insights.

The target markets for the Virtual Sapiens platform includes:
- Sales Teams (enablement and sales operations): Pharma, Biotech, Finance, Insurance
- Education: Universities, High Schools
- Human Resources (HR): Onboarding, Learning & Development Workplace Product
- Healthcare: Possible HIPA compliant software for therapist/doctors/physicians, etc.

The pre-call issues detected and addressed through the Virtual Sapiens (VS) system includes:
- Lighting (many professionals are unaware of good lighting best practices on video, meaning their images are often shrouded in shadow making true connections impossible)
- Framing (lack of awareness of the lens and how to ensure a balanced framing send ineffective non-verbals to others and detract from overall professionalism. Most participants appear in a frame with their heads too low/off center/too close or their lens too high/too low off center)
- Background (distractions are named the top drawback to virtual meetings with noisy/cluttered or spontaneous backgrounds)

Live/in-call metrics detected and to be addressed through Virtual Sapiens system includes:
- Posture (screens are like magnets and draw people into a slouch/hunched posture. This sends a signal to the audience of being tired, low energy and low confidence. This also reinforces a message to ourselves of being tired, low energy and low confidence.)
- Gestures (lack of awareness of framing and discomfort being on screen makes for a low level of gestures to be incorporated into conversation/gestures coming too close to the lens, gestures moving too quickly and not registering clearly with audience.)

Eye contact (touted as one of the things people miss most over video conferencing. Individuals tend to look at images while speaking instead of the lens. Looking at the lens=direct eye contact for the audience. Poor monitor set up will lead to presenters looking fully away from the lens in order to look at the faces of their audience. Building awareness and new habits around eye contact is crucial in order to increase effectiveness and connection over video.)

Facial expression (this is an area of massive interest and controversy. The Virtual Sapiens approach consists of monitoring dynamic changes in facial expressions as opposed to naming specific emotions which may differ from person to person and are not always ubiquitous. Included in facial expressions are head nodding/tilting to indicate active listening as a core communication skill and metric for measuring empathy and rapport building.

Tertiary issues detected and to be addressed through Virtual Sapiens system includes:

Vocal variety (volume, tone, speed, uptick)
Filler words
Balance of time spent talking/individual (Speaker share)
Sentiment analysis of the audience FIG. 1 is a block diagram illustrating components of the Virtual Sapiens (VS) Platform. According to FIG. 1, the Virtual Sapiens Platform consists of Feature, Product and Platform. Features include a VP (Virtual Presence) Pre-call Check and VP Assessment. The Pre-call Check provides an initial offering and/or customer pipeline creation tactic. This feature will likely be part of the prototype. The VP Assessment feature assists in assessing posture, gesture and eye contact for examples.

Referring to Product in FIG. 1, a VP Assessment with Data Analytics, Machine Learning, AI and Reporting application assists in assessing posture, gesture, eye contact, filler words and speech metrics, sentiment analysis and other customizable features. This application is tailored for the individual and/or for the enterprise including baseline reporting and consistent progress of Training and Monitor modes. Further, there is an opportunity to include advanced metrics which are dependent on the team or company approach.

Referring to Platform in FIG. 1, there exists a Coaching platform which provides leadership presence coaching, presentation coaching and sales training for executives. Furthermore, the platform is an international coaching platform for elevated presence and/or communications training for executives. The platform is a full-suite platform with built-in video integrations, online collaborative tools and document sharing capabilities.

The aforementioned pre-call check issues would be addressed before the start of a meeting through a Virtual Presence Pre-call Check. Before joining the meeting, the user receives a notification based on their desired alert time frame (5 minutes, 10 minutes, 15 minutes, as displayed in their settings tab of the Chrome™ extension. During this "offline check", the user will receive a live analysis of their lighting, framing and volume with suggestions on how to improve before joining the meeting. A simplified scoring scale of green (good), orange (medium) and red (low) along with more detailed/actionable feedback is provided.

Figure 2A:
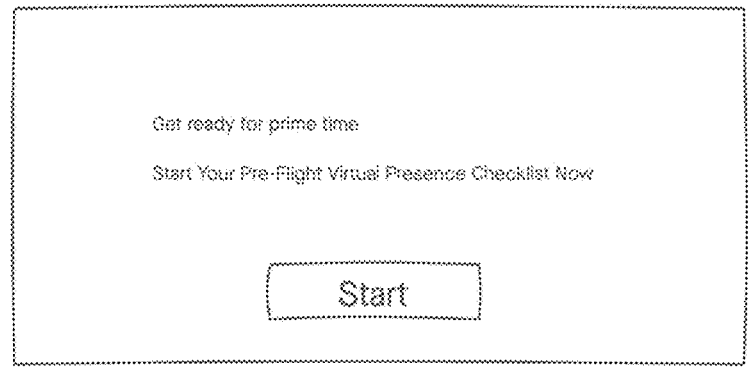
FIGS. 2A to 2D are diagrams illustrating screenshots of a Virtual Presence Pre-call Check.

FIGS. 2A to 2D are diagrams illustrating screenshots of a Virtual Presence Pre-call Check. FIG. 2A is an Intro screen where an Intro message such as "Get ready for prime time. Start Your Pre-Flight Virtual Presence Checklist Now" is displayed. The user will proceed by clicking on the "Start" button.

Figure 2B:
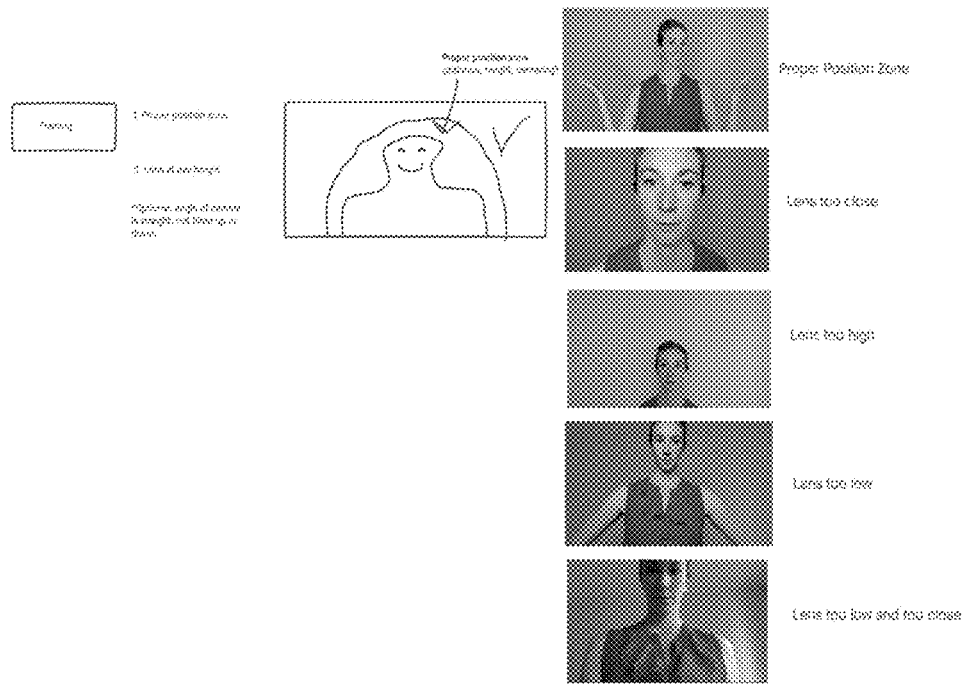

FIG. 2B is a screenshot showing Step Two of the Pre-call Check. According to FIG. 2B, Step Two includes information on Framing where the machine learning (ML) models and specified thresholds check for proper position zone and lens at eye height. An avatar is shown within a boundary or halo that will assist to align the proper position zone (i.e., distance, height and centering). Once configured correctly, a checkmark will display.

Referring to FIG. 2B, feedback will also be provided that can provide notifications on "Proper Position Zone", "Lens is too close," "Lens is too high", "Lens too low, or "Lens too low and too close".

Figure 2C:
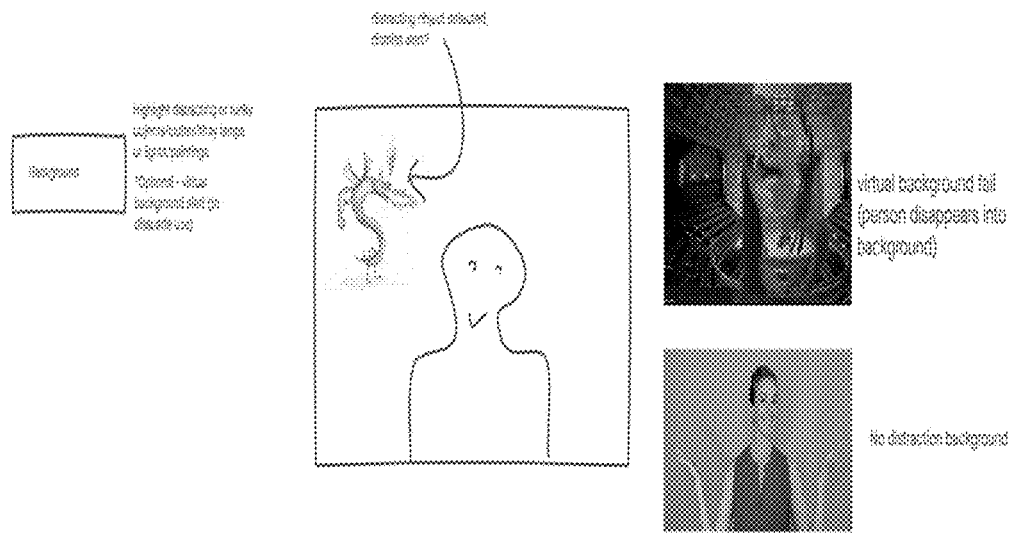

FIG. 2C is a screenshot showing Step Three of the Pre-call Check. According to FIG. 2C, Step Three includes information on Background where the system highlights distracting or funky objects, clutter, stray lamps, lights or paintings that may be a distraction.

FIG. 2C may display an avatar of the user and an avatar or icon (i.e., cartoon image of a dragon) illustrating a distracting object notification. A message such as "Distracting object detect, dismiss alert?" may be displayed. Further, a coach may appear with a message such as "No distraction background" or "Virtual background fail" where a person may disappear into the background.

Figure 2D:
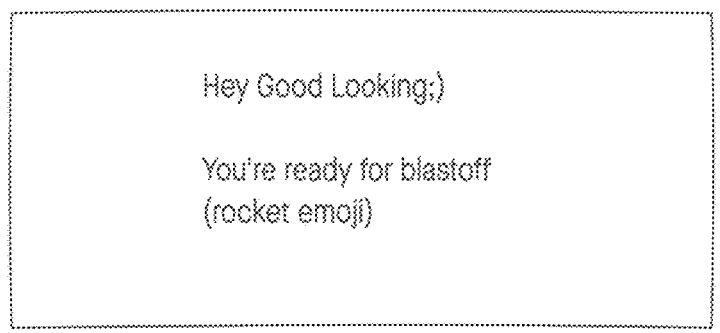

FIG. 2D is screenshot of a Confirmation screen indicating the Pre-call Check is complete. A confirmation message such as "Hey Good Looking. You're ready for blastoff" may be displayed. Emojis (or emoticons) and/or icons such as a rocket emoji may also be displayed.

FIG. 3A to FIG. 3E are diagrams illustrating screenshots of a Virtual Presence Assessment. According to FIG. 3A, the Virtual Presence Assessment is a software program that runs in the background on a computer, preferably as a layer over a preferred video conference platform.

To begin, the individual (user) would first calibrate their ideal posture and eye contact level. Throughout the meeting and/or presentation, the Virtual Presence Assessment program records the performance along the follow core aspects: posture, gestures, eye contact/line of focus. In further embodiments, there is an option to upgrade to two additional aspects including speech and voice options, including tonality and filler words.

Figure 3A:
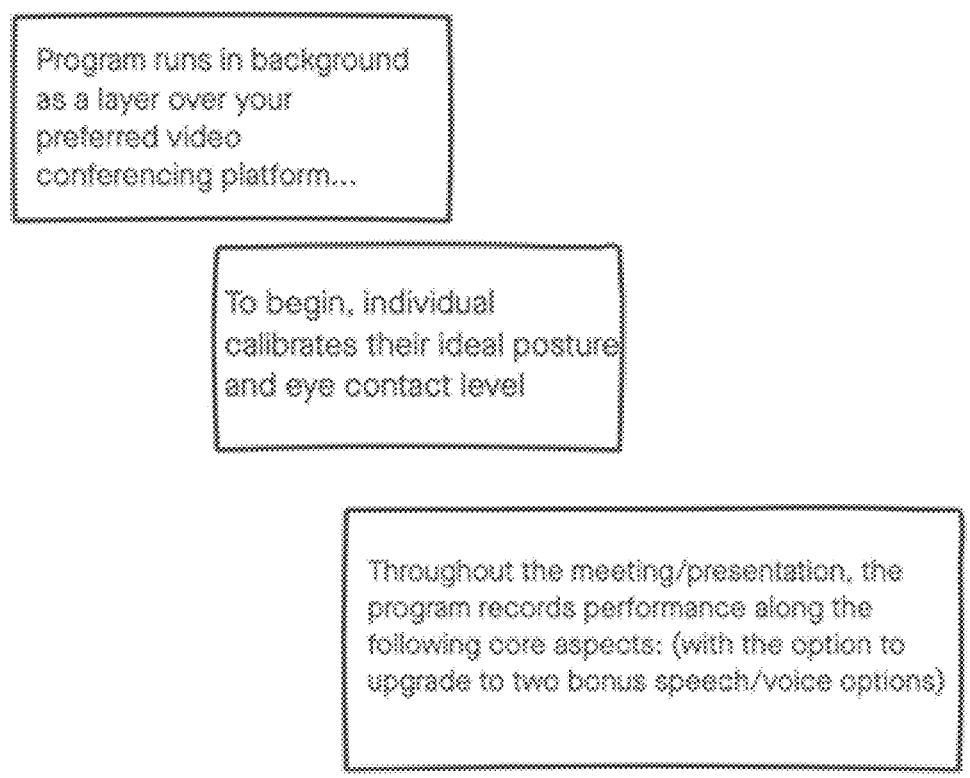
Figure 3B:
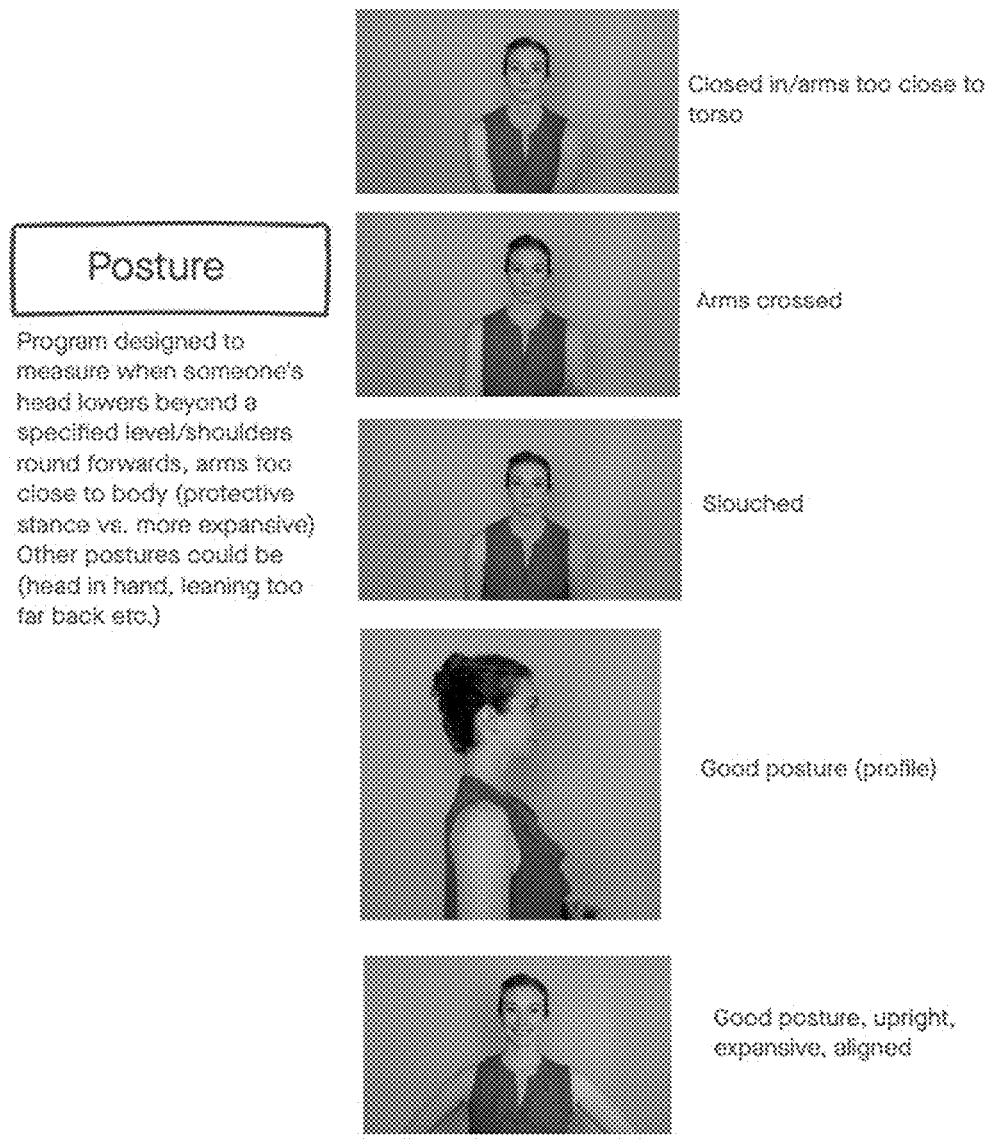

FIG. 3B is a screenshot illustrating screens related to posture. According to FIG. 3B, The Virtual Presence Assessment program is designed to measure a person's posture. It monitors when someone's head lowers beyond a specified level, whether the shoulders round forwards, whether the arms are too close to the body (i.e., protective stance vs more expansive stance), whether the head in hand and whether the user is leaning too far back.

An avatar and/or a coach is available to provide guidance on each position, including but not limited to, closed in/arms too close to torso, arms crossed, slouched, good posture (profile view), good posture and upright and expansive and aligned. Furthermore, FIG. 3B also provides a scoring legend with a range of scores where below 50% is poor, 50%-75% is medium (within calibrated zone) and 75%-100% is excellent (within calibrated zone).

FIG. 3C is a screenshot illustrating screens related to gesture. According to FIG. 3C, The Virtual Presence Assessment program monitors gestures on a variability scale and pacing (i.e., too quick/blurred which is not good, or weighted and emphatic which is good).

An avatar and/or a coach is available to provide further guidance including coaching for "Use of baton arm/fist, pumping up/down of hand to emphasize a point", "Palms down/authority and statement accent", "Steeping or other expansive/power hand posture", and "Palms up/outstretched/indicating openness, honesty, welcoming".

FIG. 3C also provides a scoring legend wherein no movement indicates a poor score, spastic movement/same movement repeatedly/too close to lens indicate a medium score, and varied movement with clear pacing and easy to read distance from lens produce an excellent score.

FIG. 3D is a screenshot illustrating screens related to eye contact/line of focus. According to FIG. 3D, The Virtual Presence Assessment program monitors the average pattern of focus. Focus monitors whether the user is looking directly at the camera (good), looking away too often with a full head turn (not good). Further, this program also monitors eye contact (good)/number of times looked at camera lens versus elsewhere (not good).

A coach and/or avatar would provide guidance for "Good eye contact/focus", "Looking away/distracted repeatedly", or "Fully looking at something else that is not aligned with the camera lens".

FIG. 3D also provides a scoring legend wherein a score below 50% within calibrated eye contact zone is poor, a score 50%-75% within calibrated eye contact zone is medium and a score between 75%-100% within calibrated eye contact zone is excellent.

FIG. 3E is a screenshot illustrating two bonus add-on aspects to monitor, including tonality and filler words. Tonality measures the vocal variety of the voice, including tone, pitch, volume and speed. The filler word feature counts certain filler words spoken by the user, including "Ums" and "Ahs".

Figure 4A:
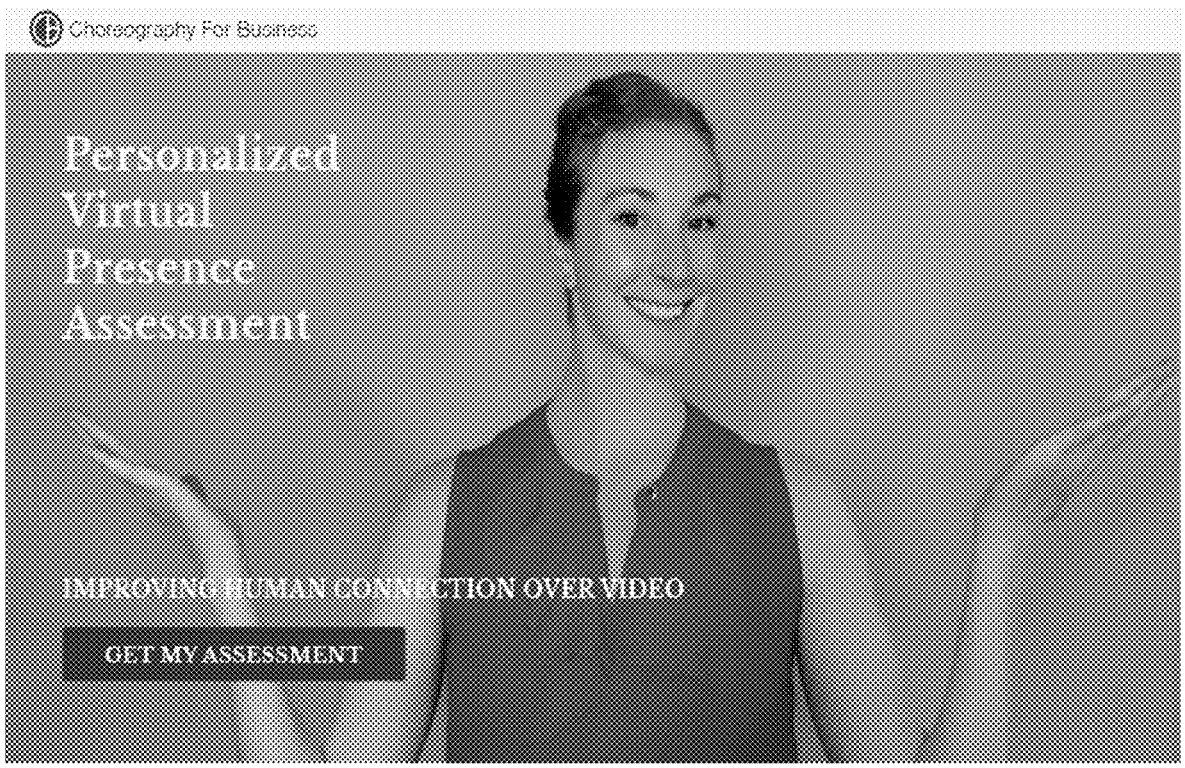

FIG. 4A to FIG. 4H are diagrams illustrating screenshots of a Virtual Presence WebCam/Assessment Experience. FIG. 4A illustrates an exemplary landing page for a Virtual Presence (VP) Assessment. This page would have a propose a warm landing page with a button to proceed (i.e., "Get My Assessment")

Figure 4B:
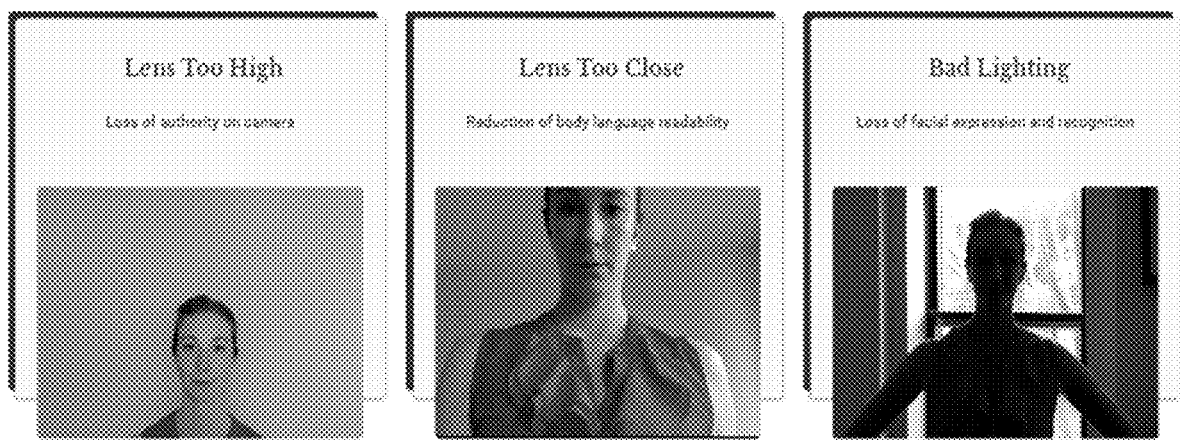
Figure 4C:

According to FIG. 4A, the home page would also provide some goals for the project, including
 Build data around core VP metrics such as lighting, framing, background, eye contact, posture, gestures
 Build a waitlist/pipeline for Direct to Consumer FIG. 4B illustrates a Virtual Presence Info screen. According to FIG. 4B, a Virtual Presence Info screen may be provided to educate on when virtual presence fails, including info on:
 Lens Too High: Loss of authority on camera
 Lens Too Close: Reduction of body: Reduction of body language readability
 Bad Lighting: Loss of facial expression and recognition
 Further, Virtual Presence skills allow the user to do the following:
 More deeply communicate with your colleagues
 Develop trusting relationships with your clients
 Manage your own energy and focus
 Hold your audience's attention in virtual presentations FIG. 4C illustrates an exemplary Virtual Presence Poll. According to FIG. 4C, a virtual poll is provided including the following question and options:
 1. What do you find most challenging when it comes to video communications:
  Staying focused
  Feeling Connected to my audience/presenter
  Video conferencing fatigue
  Delivering content with enthusiasm
  Other: _____ (user provide own response)

According to FIG. 4C, there is also a button to "Vote Now" to proceed onto the next screen.

Figure 4D:
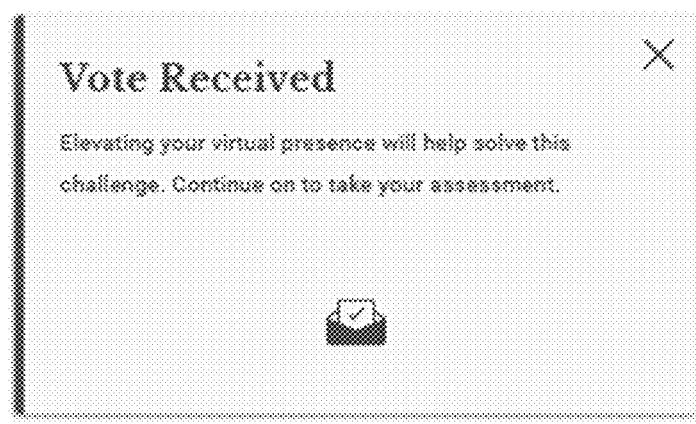

FIG. 4D is a diagram illustrating a successful Vote Received screen. According to FIG. 4D, a screen indicating successful receipt of an updated vote. A message such as "Elevating your virtual presence will help solve this challenge. Continue on to take your assessment" is provided.

Figure 4E:

FIG. 4E illustrates an exemplary Elevate Your Virtual Presence screen. According to FIG. 4E, an Elevate Your Virtual Presence Screen provides a further pitch to the user on signing up for the Virtual Presence assessment. FIG. 4E, provides info on special price ($29.99 limited special, $150 value) and a quick response (i.e., "personal assessment in 24 hours").

Further info on the process is provided; these "How This Works" steps include:
 1. Select your topic
 2. Record your 30-60 second video
 3. Enter your details and payment Furthermore, a button to "Agree & Begin" is provided. FIG. 4E, also provide some legal Terms and Condition, including a disclaimer citing that "Your video and data are private and will not be shared with any third parties."

Figure 4F:
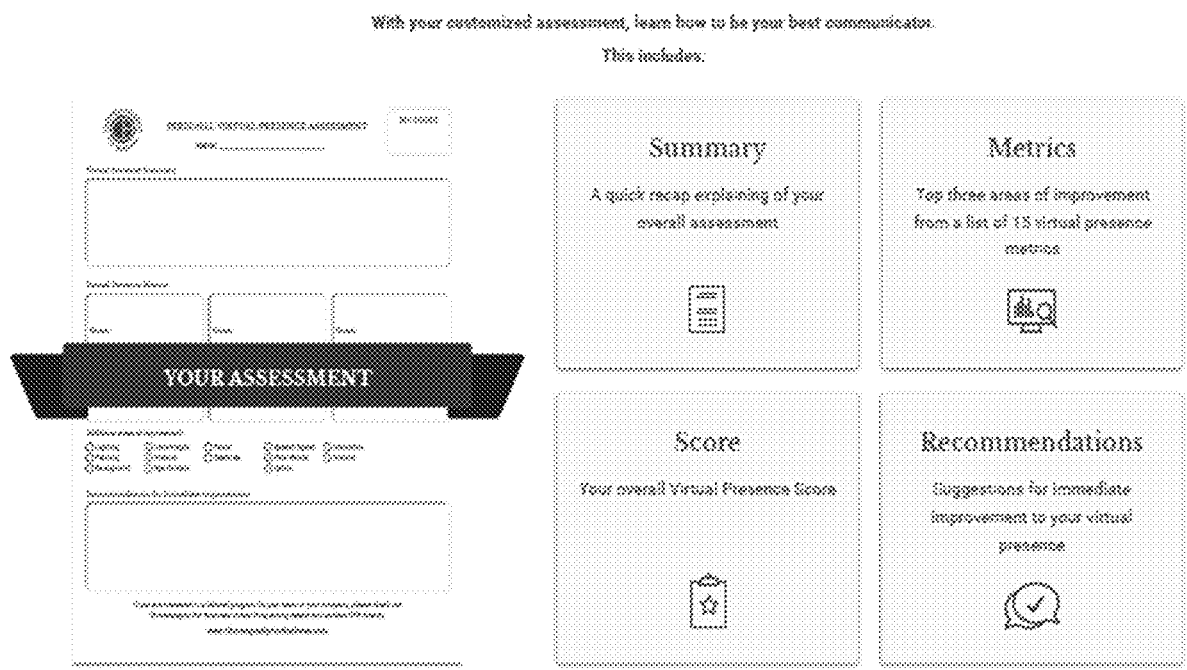
Figure 4G:
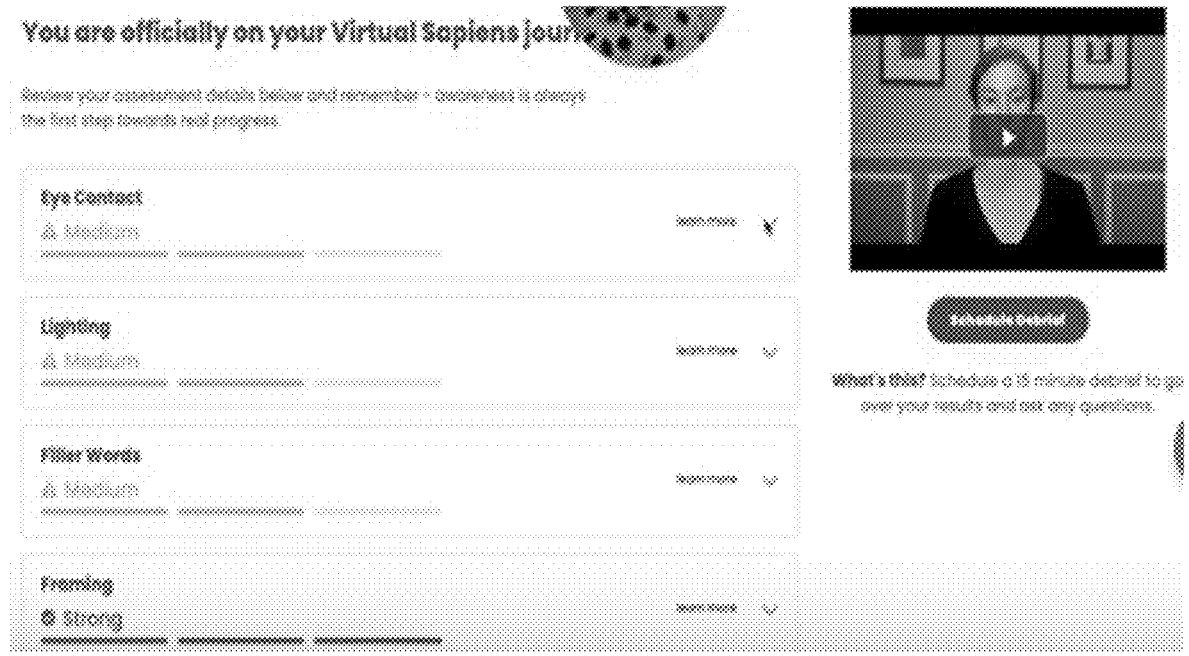

FIG. 4F is a diagram illustrating an exemplary Customary Assessment screen. According to FIG. 4F, this screen provides information that "With your customized assessment, you can learn how to be your best communicator". A Customary Assessment includes:
 A custom assessment template. (See FIG. 6A for more info)
 Summary: a quick recap explaining of your overall assessment
 Metrics: top three areas of improvement from a list of 15 virtual presence metrics
 Score: Your overall Virtual Presence Score
 Recommendations: Suggestions for immediate improvement to your virtual presence FIG. 4G is a diagram illustrating an exemplary Assessment Journey screen with a grading on different metrics including eye contact, lighting, filler words, framing, etc. Selecting each metric will provide more info on the score and suggestions for improvements. Also shown in FIG. 4G, is a button to "Schedule Debrief" that will allow one to book a 15 minute calendar appointment with the trainer.

FIG. 4H is a diagram illustrating an exemplary About Rachel Cossar screen. According to FIG. 4G, an exemplary screen on the inventor (and coach) is provided. This screen also provides more info on her background, experience and the need for virtual presence and communication. In further embodiments, links to video tutorials offering suggestions and hints may also be provided.

Metrics Info

According to this disclosure, a plurality of metrics such as posture, lighting, framing, eye gaze, facial expressions, gestures and face touching have been considered for assessment. The following table is a summary of these metrics:

| Feedback Positioning | User receives . . . |
|---|---|
| Pre-Call Feedback | Feedback during an interactive, pre-call check |
| First Impression Feedback | Feedback post-call on the first 6 seconds of their interaction with audience (determined by speaking trigger) for metrics in this category |
| Live In-call Feedback | Feedback during call, via floating dashboard + according to dashboard visual icons/dials/meters |
| Post-Call Feedback | Feedback immediately following the call for metrics in this category. Feedback for specific metrics nested under the associated bucket category |

| Bucket Category* | Included Metrics |
|---|---|
| Confidence | Lighting, Framing, Posture, Active eye gaze, WPM, Filler Words, Pausing, Hedging, Uptick |
| Rapport Building | Passive eye gaze, facial expressions, hedging words, gestures + active listening metrics |
| Engagement | Speak share, # of qestures asked |
| Expression and Energy | Facial expression, gestures, intonation |

**Note that these are all our priority metrics to build. So we will be focusing on these nonverbals as indicators of confidence. Once more of them are developed, we can add the more nuanced levels of communication mastery/rapport building.

The following is a table with more info on a Summary Report Card. Summary Report Card includes # of, positive events, # of red nudges, # of orange nudges, First Impression Score, Confidence score, Rapport Building, Expression and Energy. User can click into any of the above scores to view a more detailed report with specific metric details as provided in tab 'Detailed Post-Call'.

| Bucket Category* | Included Metrics | High Scoring | Medium Scoring | Low Scoring |
|---|---|---|---|---|
| First Impression | Lighting, Framing, Posture, Active eye gaze in first 10 recorded fps of speaking | When 4 of these metrics are in the strong/green category; 3 in green/strong and 1 in medium | When 2 are strong and 2 are medium; when 2 are strong, 1 is medium and 1 is NI; when all are medium; when 2 are strong and 2 are NI | When more than 2 are NI; when 2 are NI and 2 are medium |
| Confidence | Lighting, Framing, Posture, Active eye gaze, **WPM, Filler Words, Pausing, Uptick when developed | When 4 of these metrics are in the strong/green category; 3 in green/strong and 1 in medium | When 2 are strong and 2 are medium; when 2 are strong, 1 is medium and 1 is NI; when all are medium; when 2 are strong and 2 are NI | When more than 2 are NI; when 2 are NI and 2 are medium |
| Rapport Building | Passive eye gaze, facial expressions, gestures + active listening metrics (head nods/tilts when listening) | When 4 of these metrics are in the strong/green category; 3 in green/strong and 1 in medium | When 2 are strong and 2 are medium; when 2 are strong, 1 is medium and 1 is NI; when all are medium; when 2 are strong and 2 are NI | When more than 2 are NI; when 2 are NI and 2 are medium |
| Expression and Energy | Facial expression, gestures, **Intonation (when developed) | When 2 are strong | When 2 are medium, one is strong and one is medium | When both are NI; 1 is NI and 1 is medium |
| Engagement | Speak share, # of qestures asked | When both of these are green/strong | When 1 is strong, 1 is medium; when both are medium | When both are NI; 1 is NI and 1 is medium |

| Metric | Determining Post-Call Scoring | Green/Strong | Orange/Medium | Red/Needs Improvement |
|---|---|---|---|---|
| Lighting | If: None of the below lighting issues are detected - Green - Strong If: One issue is detected - Orange - Medium (Could be even better!) If: Two or more issues are detected - Red - Needs Improvement | No issues detected (No orbs, metrics for good lighting (TBC), metrics for uneven lighting (TBC) | One issue detected: orb detected OR uneven lighting detected OR not enough lighting on face | Two or more issues detected: Orb + uneven OR uneven + poor lighting on face OR Orb + poor lighting on face |

| Metric | Determining Post-Call Scoring | Green/Strong | Orange/Medium | Red/Needs Improvement |
|---|---|---|---|---|
| Feedback Language | | Lighting is near perfect - amazing job and keep it up! | Lighting on face is below the recommended brightness. Lighting on face slightly overexposed. Lighting is unevenly distributed on face. VS detects a light source present in (or light reflecting off) background. | |
| Framing | Overall Framing score based on:<br>% of total fps you are deemed 'out of frame' subtracted from the total fps count:<br>***Feedback will depend on specific framing event (i.e. lens height, centered, distance) | 0%-10% out of frame -> 100%-90% in frame | 11%-25% - out of frame -> 89%-75% in frame | 26% + out of frame 74% – in frame |
| Feedback Language | | Your framing is just right! | VS detects lens is too high, detects lens is too low, detects slightly off center in framing, detects too close screen, detects too far away from screen, detects too far away from screen | |
| Posture | Overall Posture score based on:<br>% of total fps are deemed slouched or head in hand subtracted from the total fps count:<br>***Feedback will depend on specific posture event (i.e. slouched vs. head in hand) | 0%-10% non-upright -> 100%-90% upright and open | 11%-25% - non-upright -> 89%-75% upright and open | 26% + non-upright 74% – upright and open |
| Eye Gaze Active | Active Eye Gaze Scoring determined by:<br>% of talking time spent looking at lens/lens area vs % of talking time spent looking at screen vs. % of active talking time spent looking off camera. | 80%-90% active talking time looking at lens area. | 70%-89% active talking time looking at screen | 69% talking time looking at screen OR between 0-5% of active talking time looking at lens area OR 10% active talking time looking off screen. |
| Eye Gaze Passive | Passive Eye Gaze Scoring determined by:<br>% of listening time spent looking at screen vs % of listening time spent looking off camera. | 90%-100% listening time looking at screen | 70%-89% listening time looking at screen | 69% below listening time looking at screen |
| Facial Expression | Facial Expression scoring determined by: degree of variability in facial expressions detected throughout entire call Green - Strong:<br>Face Touching scoring determined by: Total # of frames user is found with head in hand/hand touching face/hand over mouth<br>**When we see how detailed we are getting between head in hand/ touching face/covering mouth - we can drill deeper into these specifics with more specific feedback and coaching. | User touches face no more than 5 times in a call (maybe one orange flag allowance?) | User touches face between 6-10 times throughout call | User touches face over 11 times a call. |

| Metric | Determining Post-Call Scoring | Green/Strong | Orange/Medium | Red/Needs Improvement |
|---|---|---|---|---|
| Gestures | Gesture scoring by: % of total frames VS detects with hands visible WHILE talking. Expansive gesture scoring determined by: Ratio of expansive gestures vs. closed gestures total gesture fps | 40% or more of the talking fps show gestures 50/50 ratio of expansive gestures/closed gestures (with a give or 10 on either side 40/60-60/40) | 25%-39% of talking fps show gestures Between 30/70-70/30 split (once we see larger than 40/60-60/40 splits | 25% or below of talking fps show gestures Anything below or above 30/70 split |
| Words Per Minute | Use In-Browser Speech Recognition and use the transcribed data to determine speech rate. | | | |
| Speak Share | Use what percentage of the call we determine are speaking (using info from the mouth and microphone volume/frequency) | | | |
| Filler Words | Build a custom audio classifier that uses pre-trained Tensorflow.js models and use transfer learning to classify custom filler words. | | | |
| Intonation | Use a spectrogram of the microphone audio and look for variations in average frequency. | | | |
| Uptick | Use the audio spectrogram to determine utterances and analyze the utterances to detect uptick. | | | |
| # of questions asked | Determine if the utterances from the uptick above start w/a typical question (who, what, where, etc.). It uses a combo of the spectrogram and the speech recognition. | | | |
| Pauses | Use the spectrogram to detect pauses between utterances. | | | |
| Hedging words | Use the in-browser speech recognition for common patterns of hedging. | | | |

FIGS. 5A to 5D are diagrams illustrating screenshots on recording a Virtual Presence Assessment Experience. According to FIG. 5A, an introductory screen with a closed curtains (and/or closed curtain animation) is provided. The curtains cover details and will slowly part as the user scrolls down on the screen.

Figure 5A:
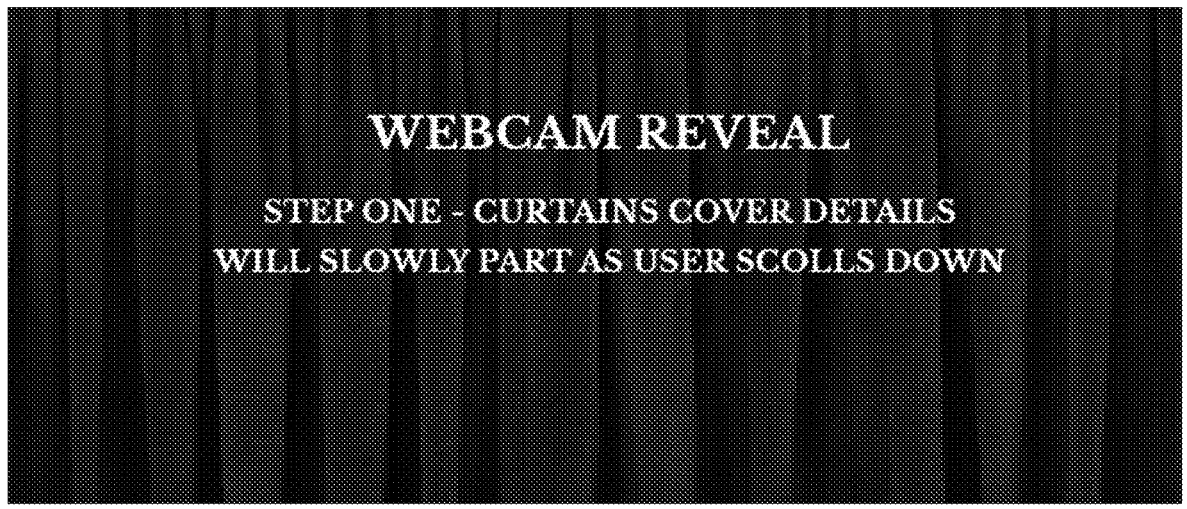
Figure 5B:

FIG. 5B is a diagram illustrating a parted Reveal Intro screen. According to FIG. 5B, as the curtains parted, details on the Virtual Presence Assessment Experience is provided, including the price ($29.99), turn-around time (i.e., within 24 hours) and steps to proceed. Further, an "Agree & Begin" button is provided to proceeded.

Figure 5C:
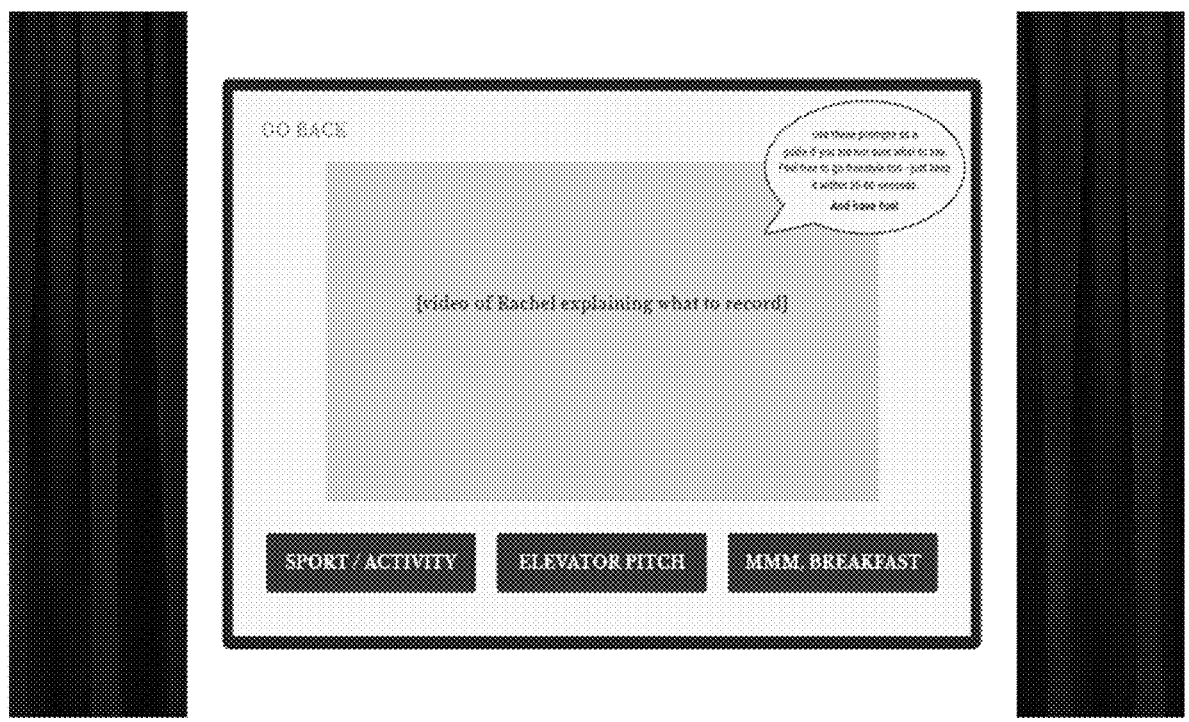

FIG. 5C is a diagram illustrating a Select Topic screen. According to FIG. 5C, the user is prompted to select a topic for recording. A prompt message such as "Use these prompts as a guide if you are not sure what to say. Feel free to go freestyle too—just keep it within 30-60 seconds. And have fun!". A further suggestion of topics such as "Sport/Activity", "Elevator Pitch" and "MMM, Breakfast" is provided as suggestions.

Figure 5D:
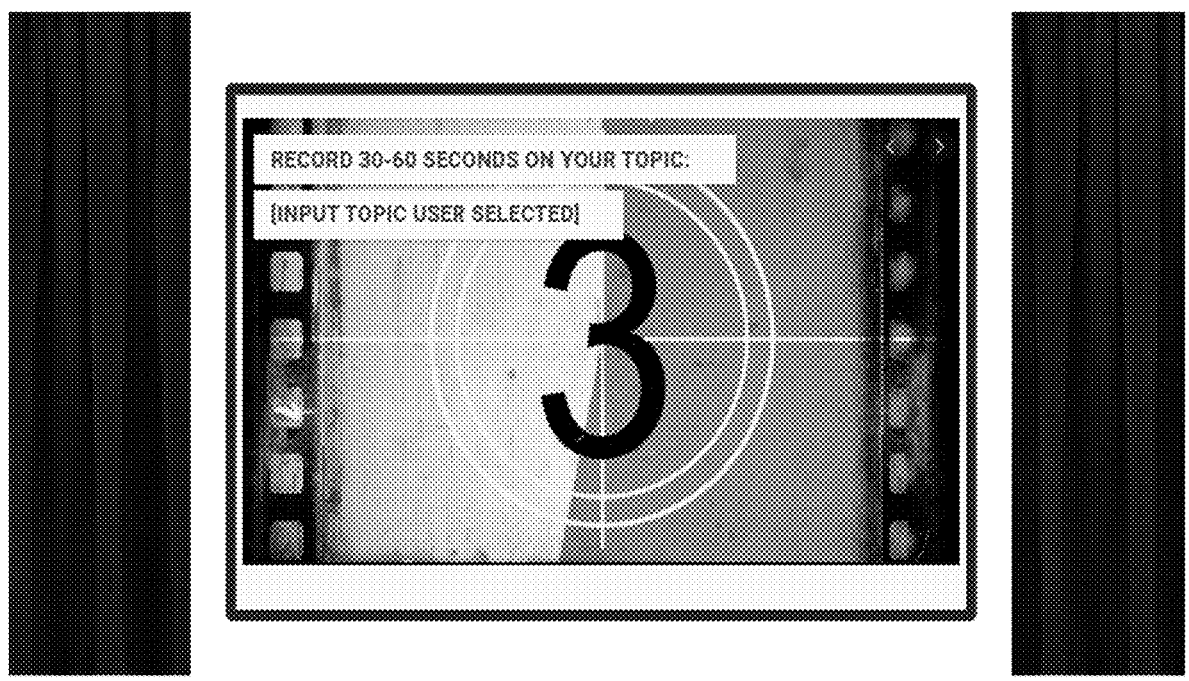

FIG. 5D is a diagram illustrating a Countdown Recording screen. According to FIG. 5D, a countdown recording screen is provided. A message such as "Record 30-60 seconds on your topic" is provided. The user is prompted to type in a topic of the recording. A countdown screen with a numbers going down (i.e., 5, 4, 3, 2, 1, 0) is provided as an animation prompt.

Figure 5E:
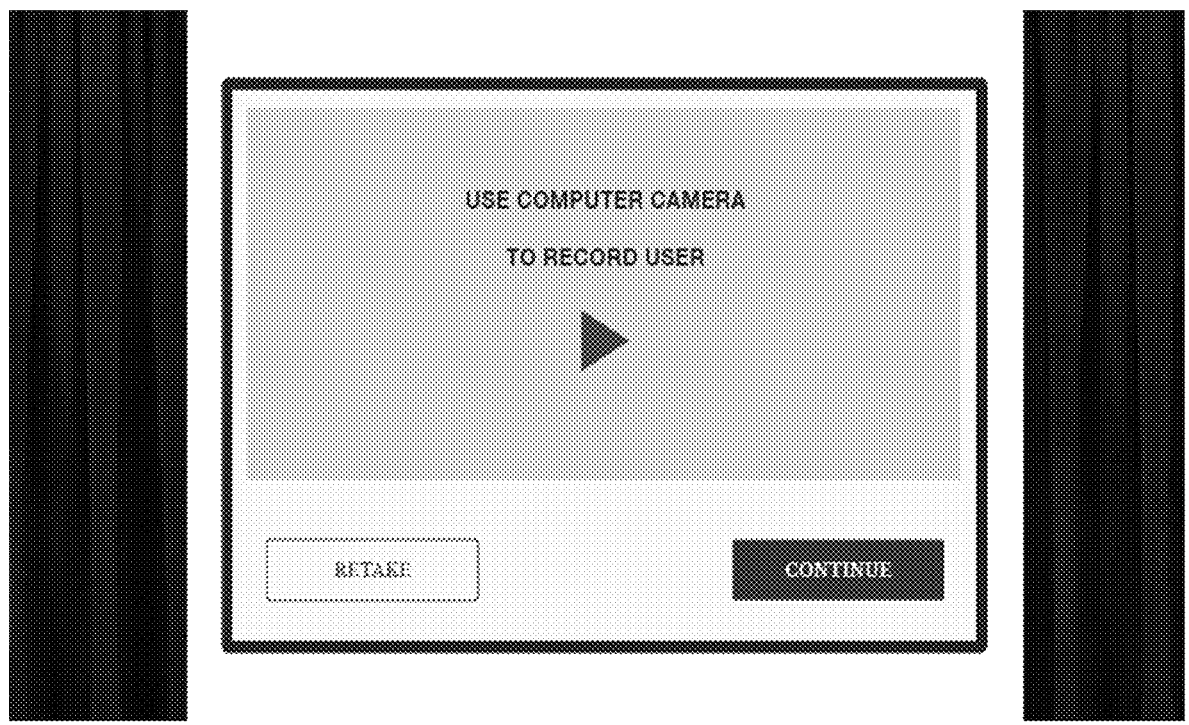

FIG. 5E is a diagram illustrating a Recording screen. According to FIG. 5E, a recording screen where instructions to "Use Computer Camera to Record User" is provided. There are buttons to "Retake" the recording and "Continue" to proceed.

Figure 5F:
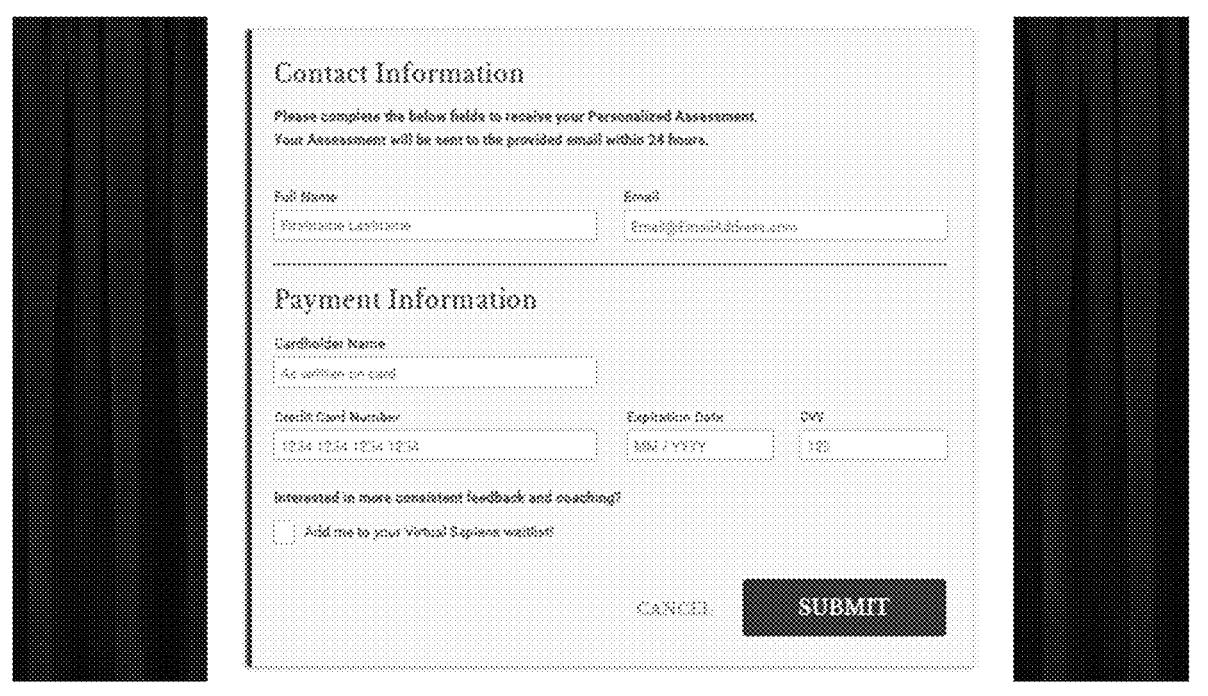

According to FIG. 5F, the Virtual Presence Application will work with the web cam or camera on a computer or mobile tablet. In further embodiments, the computer may also enable importing of files from the Internet cloud that may be stored on a cloud drive (i.e., OneDrive, Google Drive, Dropbox, etc.). In further embodiments, a mobile phone may be connected to the computer (i.e., via BluTooth®, cellular or Wi-Fi®) and enable the recording to be captured on the mobile phone and transmitted to the computer accordingly. In further embodiments, a smartwatch or fitness wearable device (i.e., Apple iWatch, Fitbit, etc.) may also be used to record the user's real-time vital statistics including heart-beat, heart-rate, oxygen level, electrocardiogram (ECG) and other relevant vital info.

FIG. 5F is a diagram illustrating a Collection and Submission screen. According to FIG. 5F, a Collection and Submission screen is provided. This screen prompts the user to provide Contact Information including their full name and email address. Further, payment information is solicited including credit card information (i.e., cardholder name, credit card number, expiration date, CVV, etc.). There is also an option to be added to the Virtual Sapiens waitlist for interest for further feedback and coaching. Finally there are buttons to "Cancel" and "Submit" to proceed.

Figure 5G:
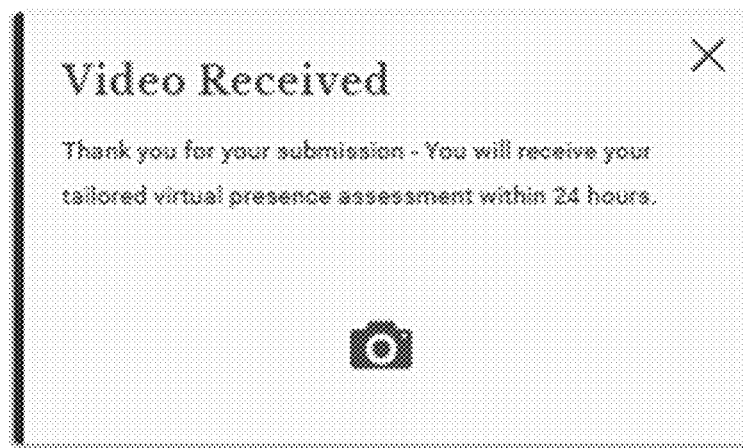

FIG. 5G is a diagram illustrating a successful Video Received screen. According to FIG. 5G, a screen indicating successful receipt of an updated video is displayed if the video is uploaded successfully. A message such as "Thank you for your submission—You will receive your tailored virtual presence assessment within 24 hours.".

Figure 6B:

FIGS. 6A and 6B are diagrams illustrating an exemplary final assessment templates. FIG. 6A is a diagram illustrating an exemplary final assessment template. As seen in FIG. 6A, includes such fields a general Summary, Metrics fields with score and feedback, suggestions for areas for improvement (i.e., lighting, framing, background, lens height, posture, eye contact, facial, gestures, speech speed, filler words, uptick, intonation, volume). There is also a field to display Recommendations for Immediate Improvement. Finally, a score is provided on the top right corner, based on the results of the assessment.

FIG. 6B is a diagram illustrating an exemplary completed final assessment. As seen in FIG. 6B, an exemplary assessment is provided for "John Doe". All the fields are completed with scoring and feedback provided for Lighting, Framing and Facial expressions metrics. A final score of "70" is provided with some suggestions for improvement. In further embodiments, feedback and improvements also includes website that provides a list of video tutorials.

In further embodiments, a user can conduct multiple assessments (i.e., Assessments 1, 2 and 3) where the results of previous assessments can be used for future assessments in order to track the improvement of the user.

According to a further embodiment, instead of having the VP Assessment sent away to be assessed, the Virtual Presence application may include artificial intelligence (AI) and machine learning (ML) algorithms that may be used to automatically conduct an assessment and provide a final assessment in real-time or near real-time.

As previous disclosed, secondary issues detected and to be addressed through Virtual Sapiens system include posture, gesture and eye contact. In further embodiments, further training modules such as the Virtual Sapiens Side-Kick mode and Virtual Sapiens Stealth mode modules may be provided.

Virtual Sapiens SideKick

According to a further embodiment, Virtual Sapiens Sidekick is provided. Virtual Sapiens Sidekick is a browser extension (e.g., Google Chrome™, Mozilla Firefox®, Safari®, etc.) that integrates with existing video conferencing platforms (E.g., Zoom®) and calendar applications (e.g., Google Calendar, Microsoft Outlook®). This live, in-call nudge system works with any video conferencing platform and integrates conveniently with a calendar application to auto-launch at the start of meetings.

Figure 7A:
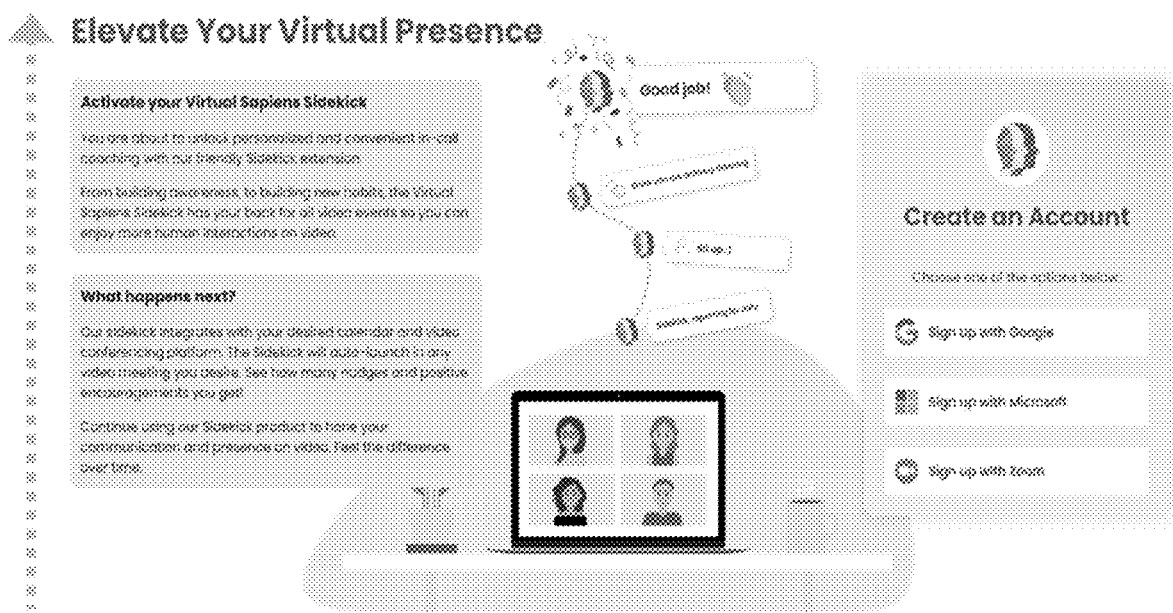
Figure 7B:
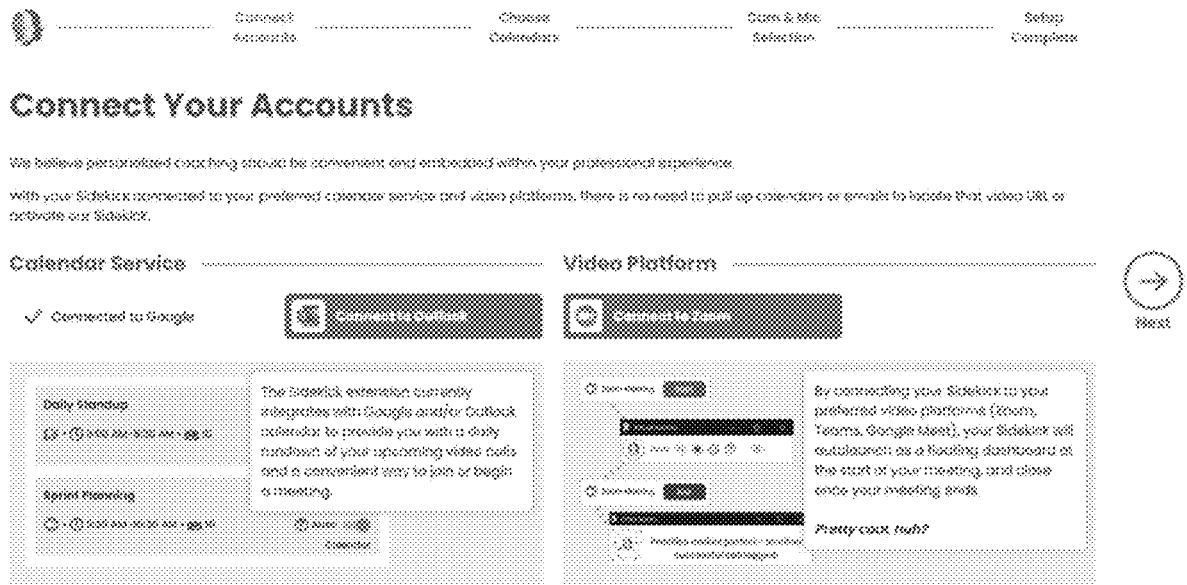

The Virtual Sapiens Sidekick mode consist of the following:
 Live feedback during call
 User will receive an alert/nudge when posture is below calibrated 'ideal posture zone' for more than 15 seconds. (time subject to change)
 User will receive an alert/nudge when eyes have been turned away from screen for more than five seconds during a talking period.
 User will receive an alert/nudge when gestures are either non-existent/too close to lens/too speedy FIGS. 7A to 7F are diagrams illustrating screenshots of a Virtual Sapiens Sidekick experience. FIG. 7A is a screenshot illustrating an exemplary Sidekick welcome screen that greets the user when come to this dashboard screen. FIG. 7B is a screenshot illustrating an exemplary Sidekick connect accounts screen where the user is prompted to connect to a calendar service (e.g., Google Calendar, Microsoft Outlook®) and/or a video conferencing platform (e.g., Zoom™).

Figure 7C:
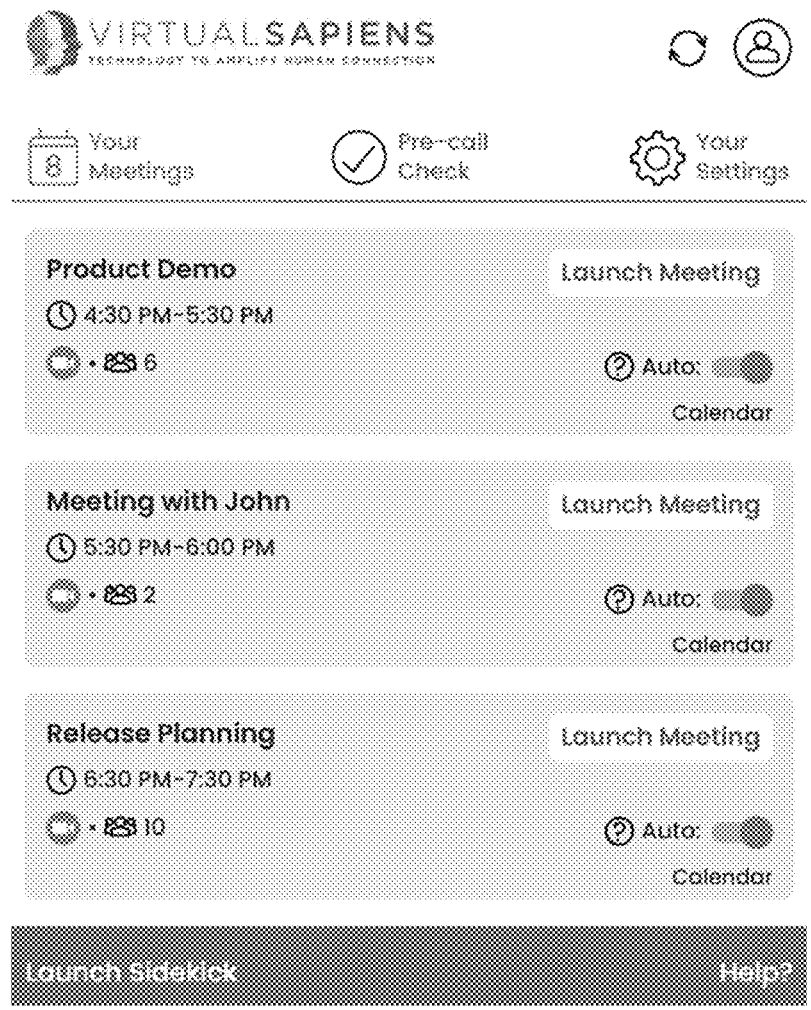

FIG. 7C is a screenshot illustrating an exemplary Sidekick extension screen as seen from a browser (e.g., Google Chrome™). According to FIG. 7C, a list of upcoming calendar appointments is shown with the option to "Launch Meeting".

Figure 7D:
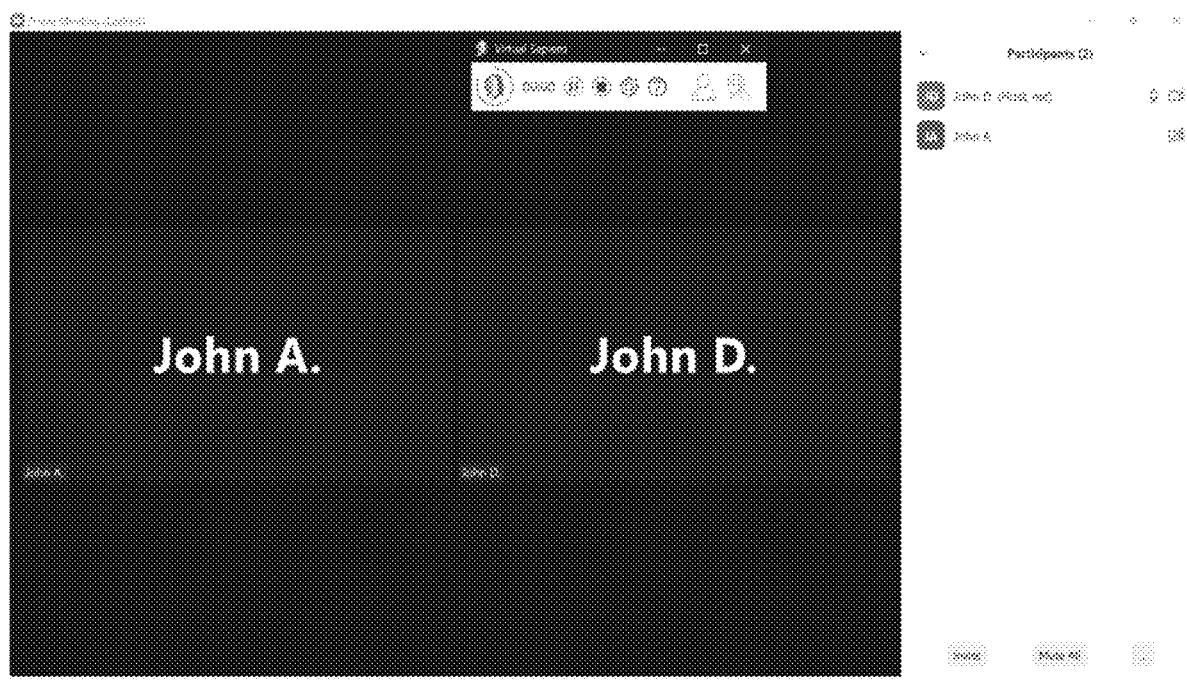

FIG. 7D is a screenshot illustrating an exemplary Sidekick Zoom session. When the "Launch Meeting" is selected in FIG. 7C to launch a Zoom video conference meeting, the Zoom session, as shown in FIG. 7D is shown. According to FIG. 7D, to people (John A. and John D.) are connected to a Zoom video conference session.

FIG. 7E is a screenshot illustrating an exemplary Sidekick manage connections screen. According to FIG. 7D, the Sidekick application can connect or disconnect to one or more accounts. The application must be connect to at least 1 account (provider).

Figure 7F:
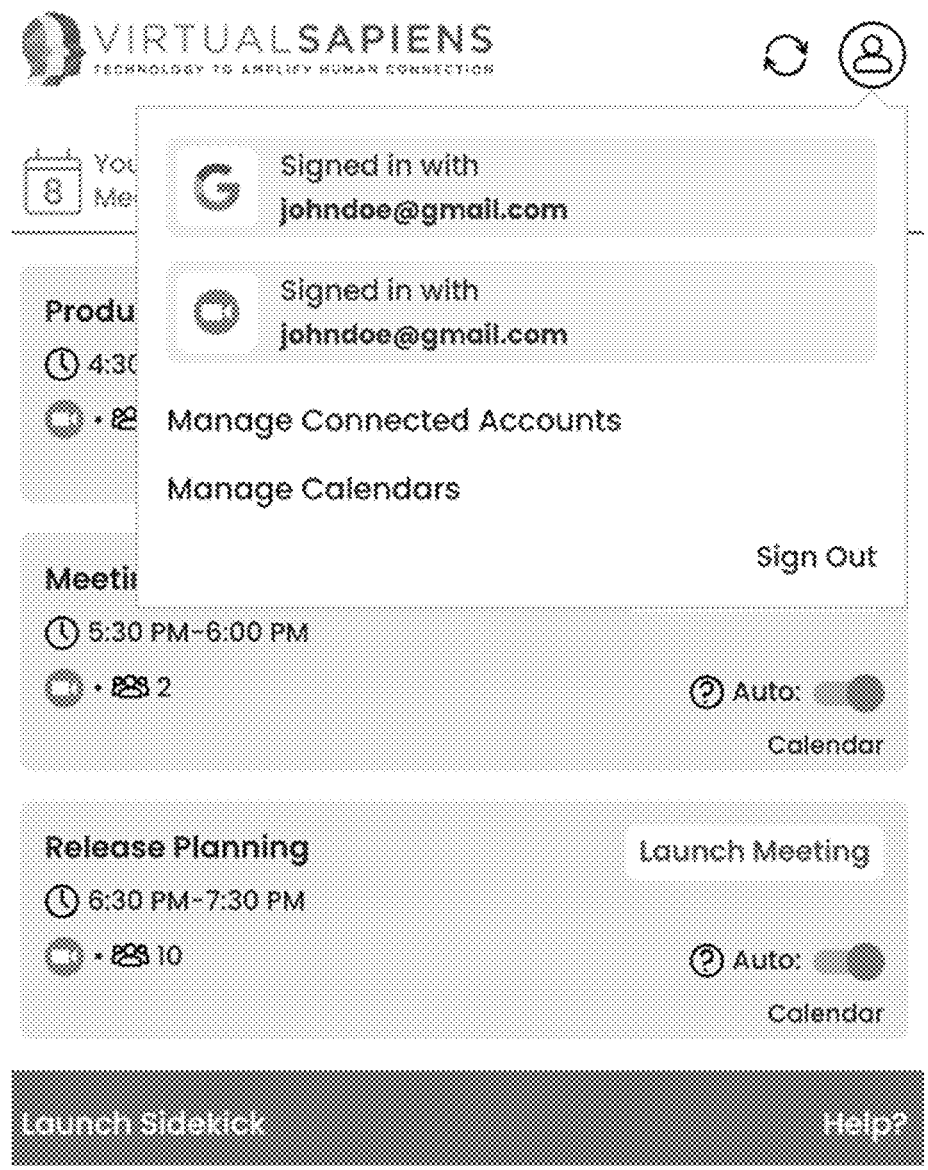

FIG. 7F is a screenshot illustrating an exemplary Sidekick sign out screen. According to FIG. 7F, when the "Sign Out" option is selected, the Sidekick displays menu selection to sign in and sign out. Furthermore, the options to "Manage Connected Accounts" (i.e., shown in FIG. 7E) and "Manage Calendar" (i.e., shown in FIG. 7B) is also provided.

FIG. 8 is a diagram illustrating a screenshot of post-call summary feedback. According to FIG. 8, a summary of meeting results is provided. The meeting duration time is shown. A metric score for Confidence, Rapport Building/Empathy and Expression and Energy is also shown. Furthermore, a list of top areas to improve is also provided. According to FIG. 8, the top areas to improve include "Framing" and "Posture". More info on these assessments is also provided with links to video tutorials to provide more info.

Figure 9:
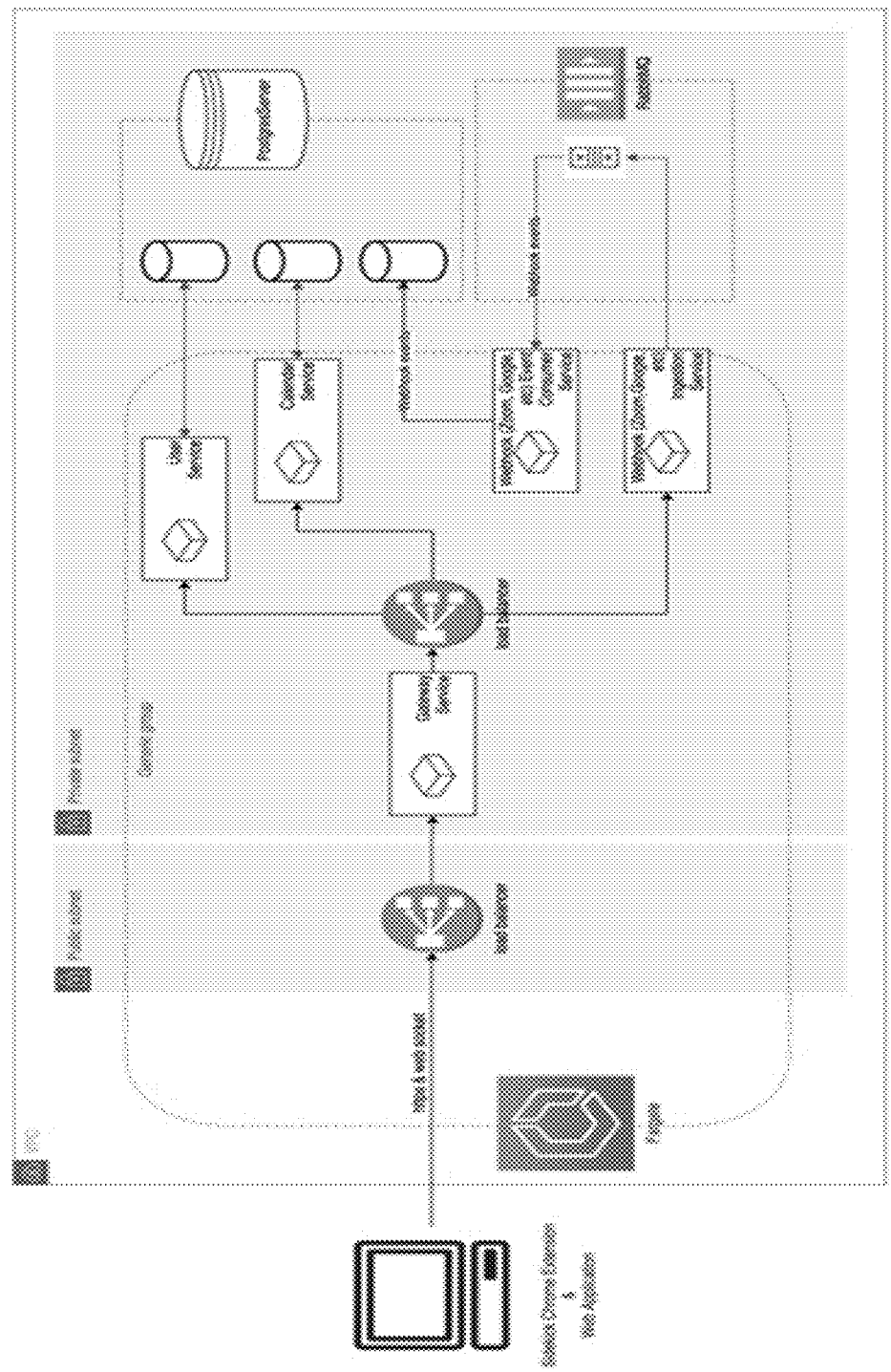
FIG. 9 is a block diagram illustrating a Virtual Sapiens Microservice Architecture.

FIG. 9 is a block diagram illustrating a Virtual Sapiens Microservice Architecture. According to FIG. 9, a microservice architecture or system for a Sidekick Chrome™ extension and web application included connections to a virtual personal computer (VPC), public subnet and private subnet. The Chrome™ extension connects to Amazon Web Service (AWS) Fargate via https and web sockets. AWS Fargate is a serverless, pay-as-you-go compute engine that lets developers build applications without managing servers.

According to FIG. 9, within the AWS Fargate architecture, the Chrome™ extension connects to load balancers and gateway service. Load balancers further connects to user service, calendar service and a plurality of webhooks (e.g., Zoom®, Google®). The user service and calendar service further connects to a plurality of database to store the data, specifically PostgreSQL. PostgresSQL is a free and open-source relational database management system (RDBMS) emphasizing extensibility and SQL compliance.

According to FIG. 9, the webhooks further connects to messaging middleware such as RabbitMQ. RabbitMQ is an open-source message-broker software that enables software applications to connect and scale. Applications can connect to each other, as components of a larger application, or to user devices and data. Messaging is asynchronous, decoupling applications by separating sending and receiving data. Furthermore, using a message broker such as RabbitMQ is a standard practice in a microservices architecture. Simply put, it allows the various services in our microservices to communicate with each other in a scalable, asynchronous fashion.

Figure 10A:
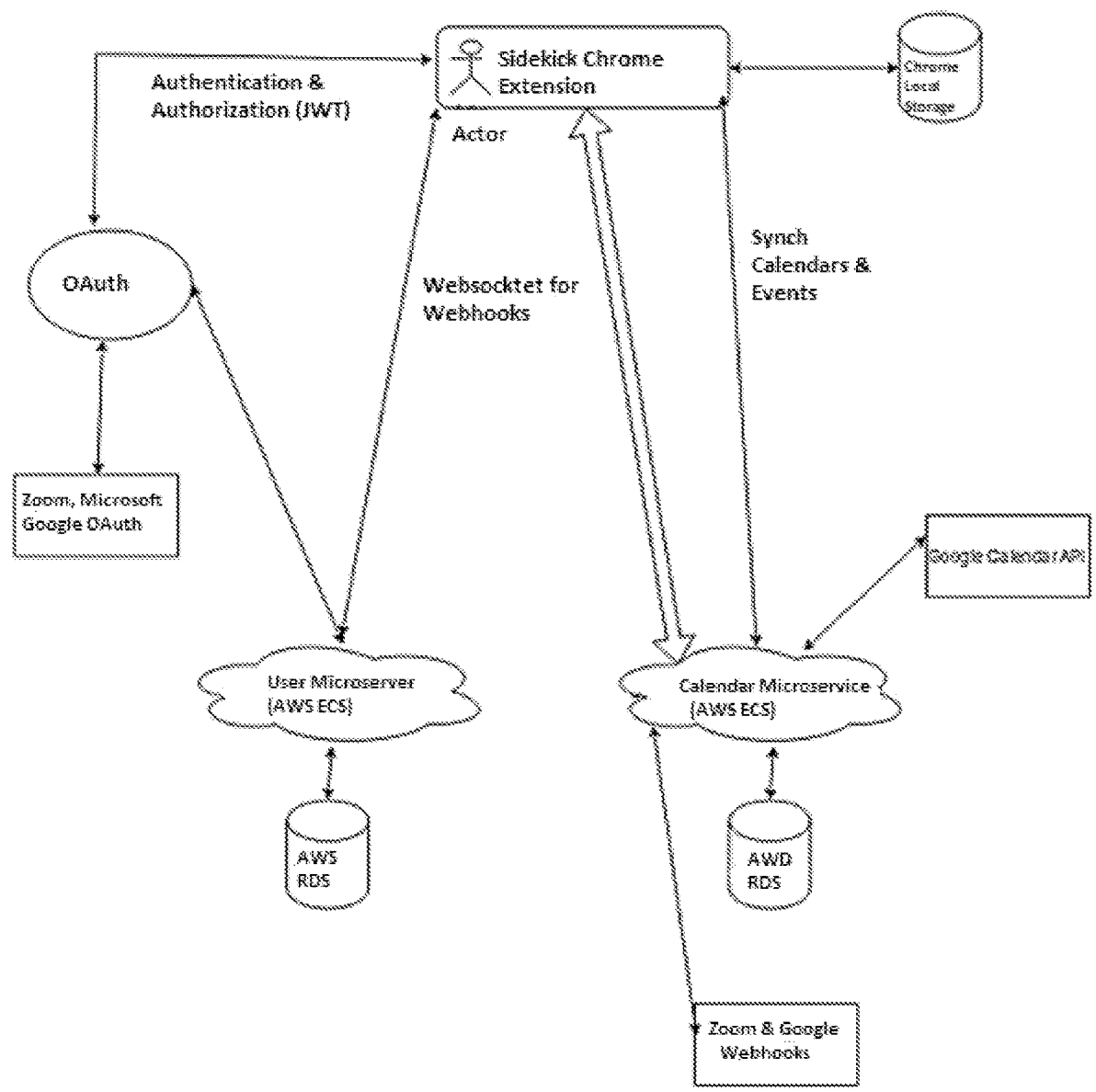
FIGS. 10A and 10B are block diagrams illustrating a Virtual Sapiens Sidekick Architecture.
Figure 10B:
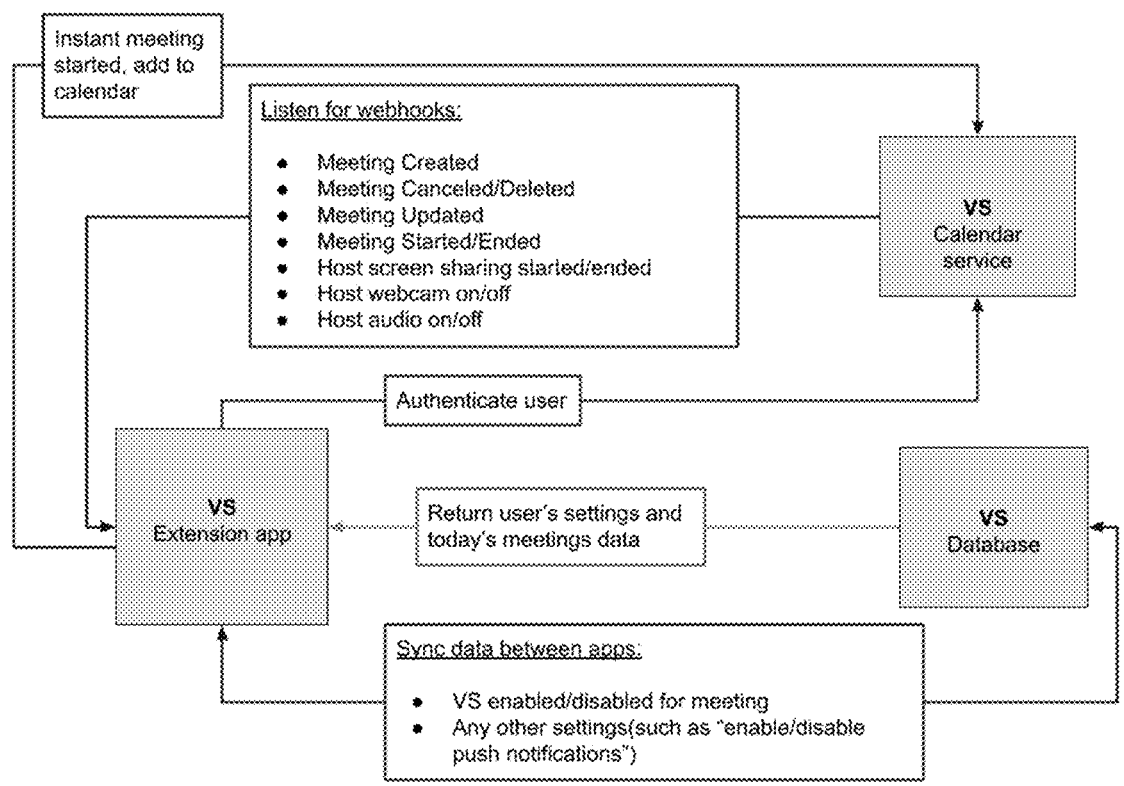

FIGS. 10A and 10B are block diagrams illustrating a Virtual Sapiens Sidekick Architecture. FIG. 10A is a block diagram of the Virtual Sapiens Sidekick Architecture. According to FIG. 10A, the main application is a Sidekick Chrome™ extension which connects to a Chrome™ Local Storage database. The Chrome™ extension also connects to OAuth, as well as other OAuth services (e.g., Zoom®, Microsoft®, Google® OAuth).

According to FIG. 10A, the Chrome™ extension also connects to a User Microservice layer through such a connection as Amazon Web Service Elastic Container Service (AWS ECS) through websockets or webhooks. AWS ECS is a cloud-based fully managed container orchestration service that makes it easy for applications to deploy, manage, and scale containerized applications. Furthermore, the user microservice further synchronizes with an Amazon Web Service Relational Database Service (AWS RDS). AWS RDS is a web service running "in the cloud" designed to simplify the setup, operation, and scaling of a relational database for use in applications According to FIG. 10A, the Chrome™ extension also connects to a Calendar Microservice layer through such a connection as Amazon Web Service Elastic Container Service (AWS ECS) to sync calendars and events. The calendar Microservice layer further facilitates connections with another instance of AWS RDS, Google calendar APIs and Zoom® and Google® Webhooks. In further embodiments, the Calendar Microservice may also support other calendar applications (e.g., Microsoft Outlook®) and formats. The reason for this microservice is to enable the Chrome™ extension (and any other applications) to be aware of all video calls from the calendar application.

FIG. 10B is a block diagram of the Virtual Sapiens API calls. According to FIG. 10B, the system consists of a VS Extension application (e.g., Virtual Sapiens Sidekick), VS Calendar service and a VS Database. The process initiates when an "instant meeting is started and added to a calendar" whereby the VS extension application will make this request with the VS Calendar service.

The VS Calendar service will listen for webhooks and send these requests to the VS Extension application. Webhooks include such actions as "Meeting Created", "Meeting Canceled/Deleted", "Meeting Updated", "Meeting Started/Ended", "Host screen sharing started/ended", "Host webcam on/off", Host audio on/off". Thereafter, the VS Extension application with authenticate the user with the VS Calendar service.

According to FIG. 10B, the VS database returns "user settings and today's meetings data" to the VS Extension application. Furthermore, the VS database and VS extension application also facilitates data synchronization between both these application, including synching data for "VS enabled/disabled for meeting" and other settings (e.g., "enable/disable push notifications"). Furthermore, the database stores persistent data that the microservices need. Each microservice has its own database. So when a user logs in, for example, the User microservice will connect to its database to fetch data for that user. The Chrome™ extension only makes API calls to the gateway microservice, thus the database is to persist cloud data that is necessary for the Extension to work.

Virtual Sapiens Stealth Mode

According to a further embodiment, the Virtual Sapiens Stealth mode consist of the following:

Users receive a report post-call with a run-down of the areas of improvement/strengths Same analyses as sidekick mode, but no live feedback/nudges during call The user is able to 'opt-out' or silence the in-call nudge feature, but still receive post-call feedback and analytics.

This might be used in a presentation or meeting wherein the user prefers not to have nudges during the call According to a further embodiment, possible posture solutions includes:

Using body tracking, ML technology (PoseNet), ideal posture zone will be calibrated to each individual at the outset of the call (to allow for maximal individualization)

When user slouches/hunches/gets too close to the lens/too far away, this is recorded as an area of improvement According to a further embodiment, possible eye contact solutions includes:

Using eye contact tracing, ML technology (Facemesh) combined with body tracking to determine when face is turned away from lens Bonus marks for when eye contact and lens align (i.e., direct eye contact with audience) According to a further embodiment, possible gesture solution includes body tracking tech (PoseNet) combined to pick up on gesture variety, speed and smoothness. According to a further embodiment, possible audio/vocal solution includes voice waveform analysis.

According to further embodiments of this disclosure, the Sidekick or virtual presence application may also include features to provide positive reinforcements. Positive reinforcement includes a system of point accumulation (gamification) that relates to corrections following a feedback nudge as well as points based on specified time frames without having receive a nudge. Ultimately, this aspect will provide a gamified structure of tiers/levels to unlock the better you do, the more calls you do.

According to further embodiments, machine learning (ML) is used to identify the landmarks of the user's face, upper body, and hands. Machine Learning is also used to analyze audio and identify sounds, frequencies, emotions, utterances and words spoken. Artificial intelligence is used to take these landmarks to classify the user's energy, empathy, confidence, rapport building and expression during video calls and events.

The personalized feedback is made possible through the use of pre-trained Machine Learning models. Human.js wraps a series of landmarks capturing the face, upper body and hands. Furthermore, ML will be used to identify and analyze audio, sounds, frequencies, utterances and spoken words. While the models are pre-trained, the thresholds and insights are all designed based on individual insights and expert knowledge supported through founders' experience in communication coaching. While the initial phases of coaching and feedback will be relatively binary and broad, the ultimate vision is to have nuanced feedback and coaching provided alongside relevant insights based on context.

According to further embodiments, a system for providing virtual presence for measuring a user's video conferencing presentation effectiveness using presence metrics is disclosed. The virtual presence system comprises a browser based application that integrates with an Internet browser application (e.g., Chrome™ extension), an authentication module to authenticate the user with a video conferencing application, a user microservice module, a calendar microservice to connect to a calendar application and a cloud-based relational database service connected to the user microservice or calendar microservice. The browser based application synchronizes calendar activities and events with the calendar microservice and the browser based application communicates with the user microservice and calendar microservice using websockets or webhooks.

In a further embodiment, a computer-implemented method to improve video conferencing assessment using a virtual presence system is disclosed. The computer-implemented method comprises the steps of recording a video conferencing assessment on a user computer, sending the recorded video conference assessment through the Internet to a server for storage and evaluation, evaluating the recorded video conference session for presence metrics and providing a report with presence metric scores and feedback based on analysis to the user.

In a further embodiment, a computer-implemented method for synching calendar application with a video conference application by a browser based application to initiate a video conference assessment session, the method comprising the steps of adding a calendar event to a calendar application, listening for calendar events via webhooks, authenticating a user, returning user settings and meeting data info and synchronizing data between browser based application, video conferencing application and calendar application.

Implementations disclosed herein provide systems, methods and apparatus for generating or augmenting training data sets for machine learning training. The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. It should be noted that a computer-readable medium may be tangible and non-transitory. As used herein, the term "code" may refer to software, instructions, code or data that is/are executable by a computing device or processor. A "module" can be considered as a processor executing computer-readable code.

A processor as described herein can be a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, or microcontroller, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. In some embodiments, a processor can be a graphics processing unit (GPU). The parallel processing capabilities of GPUs can reduce the amount of time for training and using neural networks (and other machine learning models) compared to central processing units (CPUs). In some embodiments, a processor can be an ASIC including dedicated machine learning circuitry custom-build for one or both of model training and model inference.

The disclosed or illustrated tasks can be distributed across multiple processors or computing devices of a computer system, including computing devices that are geographically distributed. The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on." While the foregoing written description of the system enables one of ordinary skill to make and use what is considered presently to be the best mode thereof, those of ordinary skill will understand and appreciate the existence of variations, combinations, and equivalents of the specific embodiment, method, and examples herein. The system should therefore not be limited by the above described embodiment, method, and examples, but by all embodiments and methods within the scope and spirit of the system. Thus, the present disclosure is not intended to be limited to the implementations shown herein but is to be accorded the widest scope consistent with the principles and novel features disclosed herein.

What is claimed is:

1. A computer-implemented method to improve video conferencing assessment of a user using a virtual presence system, the virtual presence system comprising a processor, a browser-based virtual presence assessment application and a video conferencing application, the method comprising the steps of:
    launching or starting the browser-based virtual presence assessment application and the video conferencing application;
    authenticating the user with the browser-based virtual presence assessment application video conferencing application;
    downloading one or more pre-trained machine learning models locally on the user computer, the pre-trained machine learning models configured to work with the virtual presence assessment application;
    initiating a video conferencing assessment on the user computer;
    evaluating the recorded video conference session for presence metrics;
    displaying visual feedback nudges to the user to allow them to course correct in real-time or near real-time; and providing a report with presence metric scores and feedback based on analysis to the user;
   wherein evaluating the video conference session further comprises evaluating non-verbal presence metrics as indicators of confidence;
   wherein evaluating the video conference session further comprises using artificial intelligence (AI) or machine learning (ML) algorithms to automatically conduct the assessment in real-time or near real-time;
   wherein the feedback is made using pre-trained machine learning models, computer vision and image analytics;
   wherein the presence metrics include metrics to evaluate posture and framing as influencing factors to provide the feedback;
   wherein the machine learning algorithm is used to identify the landmarks of the user's face, upper body, and hands;
   wherein the pre-trained machine learning models are configured to analyze the video conferencing session in real-time to analyze human behaviors;
   wherein the video conferencing assessment is stored locally on the user computer and is not sent over the internet to a server.

2. The computer-implemented method of claim 1 wherein the non-verbal presence metrics further include metrics to evaluate gesture, eye contact, filler words and speech metrics, sentiment analysis and other customizable features.

3. The computer-implemented method of claim 1 wherein the feedback includes constructive feedback for improvement.

4. The computer-implemented method of claim 1 wherein artificial intelligence is used to take these landmarks to classify the user's energy, empathy, confidence, rapport building and expression during video calls and events.

5. The computer-implemented method of claim 1 where the machine learning algorithm is used to analyze audio and identify sounds, frequencies, emotions, utterances and words spoken.

* * * * *